US012722389B2

(12) United States Patent
Yasutani

(10) Patent No.: US 12,722,389 B2
(45) Date of Patent: Sep. 1, 2026

(54) PRINTING APPARATUS AND CONTROL METHOD

(71) Applicant: CANON KABUSHIKI KAISHA, Tokyo (JP)

(72) Inventor: Jun Yasutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 18/664,384

(22) Filed: May 15, 2024

(65) Prior Publication Data

US 2024/0408884 A1 Dec. 12, 2024

(30) Foreign Application Priority Data

Jun. 9, 2023 (JP) ................................ 2023-095681
Jul. 5, 2023 (JP) ................................ 2023-110555

(51) Int. Cl.
*B41J 2/18* (2006.01)
*B41J 2/17* (2006.01)
(Continued)

(52) U.S. Cl.
CPC ............... *B41J 2/18* (2013.01); *B41J 2/1707* (2013.01); *B41J 2/17593* (2013.01); (Continued)

(58) Field of Classification Search
None
See application file for complete search history.

(56) References Cited

U.S. PATENT DOCUMENTS 8,079,659 B2 12/2011 Tajika
8,186,783 B2 5/2012 Yasutani
(Continued)

FOREIGN PATENT DOCUMENTS

JP 2008-132680 A 6/2008
JP 2012-176562 A 9/2012
(Continued)

OTHER PUBLICATIONS

Apr. 30, 2025 Japanese Official Action in Japanese Patent Appln. No. 2023-110555.

*Primary Examiner* — Alejandro Valencia
(74) *Attorney, Agent, or Firm* — Venable LLP

(57) ABSTRACT

There are provided a circulation path which can supply printing material to a printing element board having nozzle capable of ejecting printing material and collect printing material not ejected from the printing element board, an acquisition unit which acquires information on concentration of printing material circulating through the circulation path, and a discharge control unit which executes discharge control of printing material concentration in which printing material is discharged from the circulation path and the circulation path is supplied with an amount of printing material corresponding to a discharge amount according to the information on concentration. In a case where the discharge control is executed, the discharge control unit selectively executes one of first discharge control in which a discharge amount of printing material concentration is a first discharge amount and second discharge control in which the discharge amount is a second discharge amount greater than the first discharge amount.

11 Claims, 25 Drawing Sheets

(51) Int. Cl.
*B41J 2/175* (2006.01)
*G06K 15/02* (2006.01)

(52) U.S. Cl.
CPC ........ *B41J 2/17596* (2013.01); *G06K 15/186* (2013.01); *G06K 15/1894* (2013.01); *G06K 2215/101* (2013.01)

(56) References Cited

U.S. PATENT DOCUMENTS

| | | | | |
|---|---|---|---|---|
| 8,439,472 | B2 | 5/2013 | Yasutani | |
| 8,511,787 | B2 | 8/2013 | Yasutani | |
| 8,540,335 | B2 | 9/2013 | Nakano | |
| 9,981,464 | B2 | 5/2018 | Karita | |
| 10,471,711 | B2 | 11/2019 | Karita | |
| 10,583,665 | B2 | 3/2020 | Nakagawa | |
| 2008/0122891 | A1 | 5/2008 | Nakano | |
| 2017/0197407 | A1 | 7/2017 | Karita | |
| 2018/0244039 | A1 | 8/2018 | Karita | |
| 2019/0202209 | A1 | 7/2019 | Nakagawa | |
| 2019/0224984 | A1* | 7/2019 | Kodera | B41J 2/165 |
| 2020/0077934 | A1* | 3/2020 | Tateishi | G01F 1/663 |
| 2024/0278569 | A1 | 8/2024 | Oikawa | |

FOREIGN PATENT DOCUMENTS

| | | | |
|---|---|---|---|
| JP | 2013-075482 | A | 4/2013 |
| JP | 2017-121788 | A | 7/2017 |
| JP | 2018-008513 | A | 1/2018 |
| JP | 2019-119083 | A | 7/2019 |

* cited by examiner

| | DEW-POINT TEMPERATURE [°C] | | | | |
|---|---|---|---|---|---|
| PRINTING ELEMENT TEMPERATURE [°C] | 10.0 | 12.5 | 15.0 | 17.5 | 20.0 |
| 25.0 | V1 | V2 | V3 | V4 | V5 |
| 27.5 | V6 | V7 | V8 | V9 | V10 |
| 30.0 | V11 | V12 | V13 | V14 | V15 |
| 32.5 | V16 | V17 | V18 | V19 | V20 |
| 35.0 | V21 | V22 | V23 | V24 | V25 |
| 37.5 | V26 | V27 | V28 | V29 | V30 |
| 40.0 | V31 | V32 | V33 | V34 | V35 |
| 42.5 | V36 | V37 | V38 | V39 | V40 |

FIG.10

PRINTING APPARATUS AND CONTROL METHOD

BACKGROUND OF THE INVENTION

Field of the Invention

The present invention relates to a printing apparatus and a control method.

Description of the Related Art

There has been conventionally known an inkjet printing apparatus configured to circulate ink through an ink circulation path including a print head to suppress ink thickening in nozzles and deterioration of ejection characteristics of ink from nozzles. In such a printing apparatus, ink is thickened, namely ink concentration is increased, in the circulation path by evaporation of ink from nozzles at the time of circulation.

Japanese Patent Laid-Open No. 2017-121788 and Japanese Patent Laid-Open No. 2018-008513 disclose a technique of (1) obtaining ink concentration in a circulation path based on an ink evaporation amount at the time of circulation and an ink consumption amount at the time of printing and (2) discharging part of thickened ink from the circulation path based on the concentration. Incidentally, in the technique of Japanese Patent Laid-Open No. 2017-121788 and Japanese Patent Laid-Open No. 2018-008513, new ink is supplied to the circulation path along with ink discharge from the circulation path to thereby maintain constant ink concentration in the circulation path.

In the technique of Japanese Patent Laid-Open No. 2017-121788 and Japanese Patent Laid-Open No. 2018-008513, however, the ink concentration obtained to determine whether to discharge ink is an estimated value. Accordingly, there may be an error between the ink concentration used to determine whether to discharge ink and actual ink concentration in the circulation path, which may inhibit suitable execution of ink discharge and promote the creation of waste ink.

SUMMARY OF THE INVENTION

The present invention has been accomplished in view of the above problem and provides a technique capable of suppressing an increase of waste ink caused by ink discharge for adjustment of ink concentration in a circulation path.

A printing apparatus is equipped with:

- a printing element board comprising a nozzle configured to eject printing material;
- a circulation path comprising the printing element board and configured to circulate printing material, supply the printing element board with printing material, and collect printing material not ejected from the printing element board;
- an acquisition unit configured to acquire information on concentration of printing material circulating through the circulation path; and
- a discharge control unit configured to execute discharge control of printing material in which printing material is discharged from the circulation path according to the information on concentration and the circulation path is supplied with an amount of printing material corresponding to a discharge amount,
- wherein in a case where the discharge control is executed, the discharge control unit selectively executes one of first discharge control in which a discharge amount of printing material is a first discharge amount and second discharge control in which the discharge amount is a second discharge amount greater than the first discharge amount.

According to the present invention, an increase of waste ink caused by ink discharge for adjustment of ink concentration in a circulation path can be suppressed.

Further features of the present invention will become apparent from the following description of exemplary embodiments with reference to the attached drawings.

BRIEF DESCRIPTION OF THE DRAWINGS

FIG. 10 is a table for acquiring an ink evaporation amount;

DESCRIPTION OF THE EMBODIMENTS

An example of a printing apparatus and a control method will be described below with reference to the accompanying drawings. It should be noted that the following embodiments do not limit the present invention and not all of the combinations of features explained in the embodiments are necessarily essential for solving the problem of the present invention. The positions, shapes, and the like of constituent elements described in the embodiments are merely shown as examples and the invention is not limited to these examples.

First Embodiment

First, a printing apparatus according to a first embodiment will be described with reference to FIG. 1 to FIG. 15.

Configuration of Printing Apparatus

Figure 1:
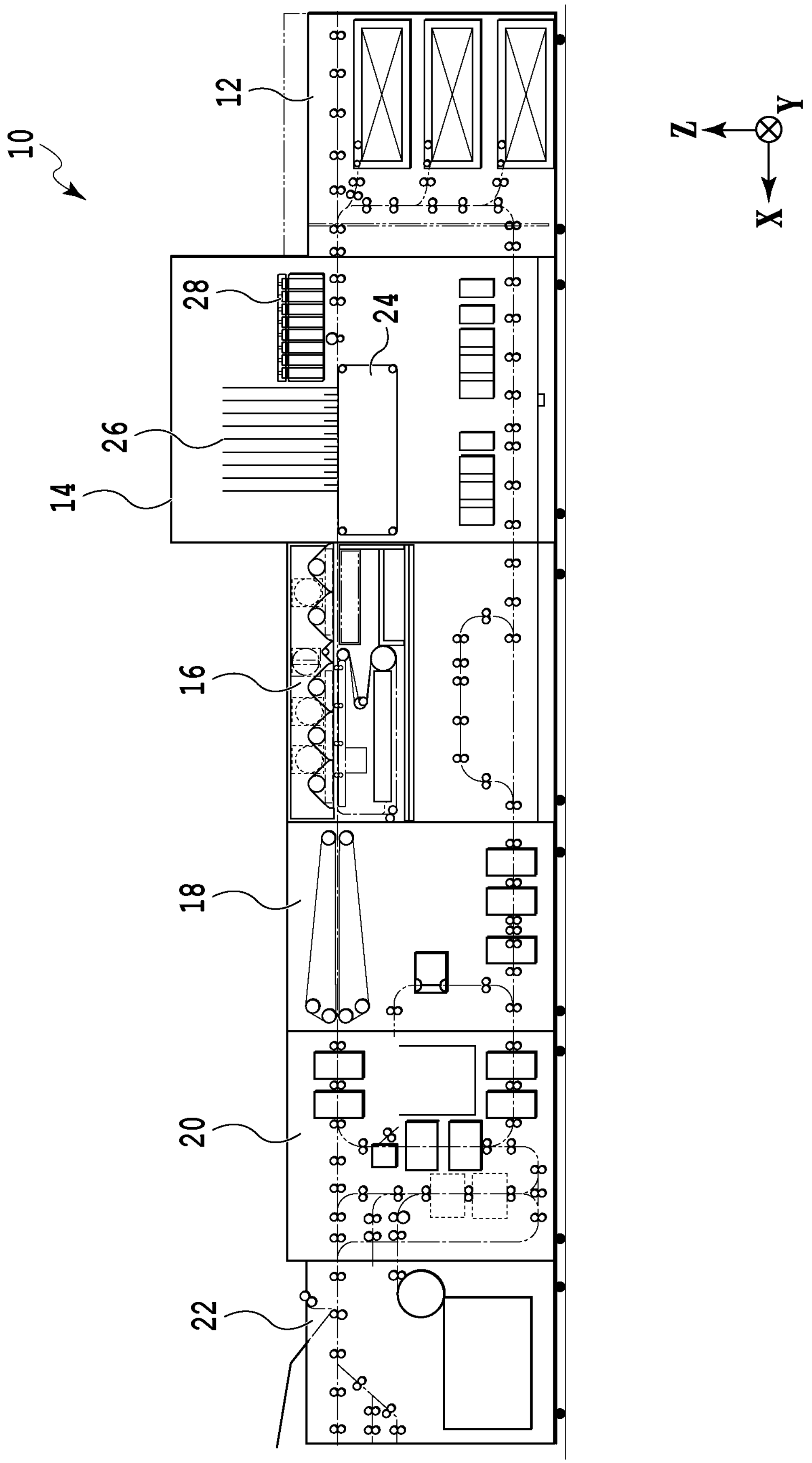
FIG. 1 is a schematic configuration diagram of a printing apparatus.

FIG. 1 is a schematic configuration diagram of a printing apparatus. A printing apparatus 10 of FIG. 1 comprises (1) a feeding module 12 which feeds a print medium in a cut sheet form and (2) a printing module 14 which performs printing on a print medium fed by the feeding module 12. The printing apparatus 10 also comprises (1) a first fixing module 16 which promotes fixing of a printing material to a printed print medium by noncontact heating and (2) a second fixing module 18 which promotes fixing of a printing material to a print medium by contact heating. The printing apparatus 10 also comprises (1) a cooling/flipping module 20 which performs cooling of a print medium and a flipping operation in double-sided printing and (2) a stacking module 22 in which discharged work products are stacked as the work products are discharged. The printing apparatus 10 further comprises a control section 200 (described later) which controls operation of the entire printing apparatus 10.

The printing module 14 comprises a conveying belt 24 which conveys a print medium fed from the feeding module 12. The conveying belt 24 conveys a print medium while fixing the print medium by air suction. The printing module 14 also comprises a print head 26 which is arranged in a position facing the conveying belt 24 and ejects a printing material to a print medium conveyed by the conveying belt 24 to perform printing. A plurality of print heads 26 are arranged side by side in a conveyance direction of a print medium. In the present embodiment, as the printing material, a processing liquid (P) for applying predetermined processing to ink ejected to a print medium is used in addition to pigment inks of four colors, a yellow (Y) ink, a magenta (M) ink, a cyan (C) ink, and a black (K) ink. Accordingly, in the present embodiment, five line-type print heads corresponding to the four color inks, Y, M, C, and K inks, and the processing liquid, respectively, are provided as the print heads 26. However, the number of colors is not limited to four in the print heads 26 of the printing module 14 and the number of print heads 26 is not limited to five. Further, ink is not limited to an ink containing a pigment and may be any of various publicly-known inks such as an ink containing a dye.

The print head 26 is configured to eject ink, for example, under an inkjet system. The inkjet system may be any of various publicly-known techniques such as a system using a heating element, a system using a piezoelectric element, a system using an electrostatic element, and a system using a MEMS element. The print head 26 is supplied with the corresponding type of ink from a main tank 606 (see FIG. 6) provided in the printing apparatus 10 through a tube and the like.

The printing module 14 comprises a maintenance section 28 for maintaining and recovering good ink ejection performance in the print head 26. For example, the maintenance section 28 comprises a cap section (not shown) which protects a nozzle surface of the print head 26 provided with nozzles to eject ink, a wiping section which wipes the nozzle surface, and a sucking section which sucks ink from the print head 26 through the nozzles. The print head 26 and the maintenance section 28 are configured to move relative to each other. For example, in a case where the maintenance section 28 is used, the maintenance section 28 is located in a position facing the nozzle surface under the print head 26. Alternatively, only each section of the maintenance section 28 may be configured to move.

Configuration of Control System of Printing Apparatus

Figure 2:
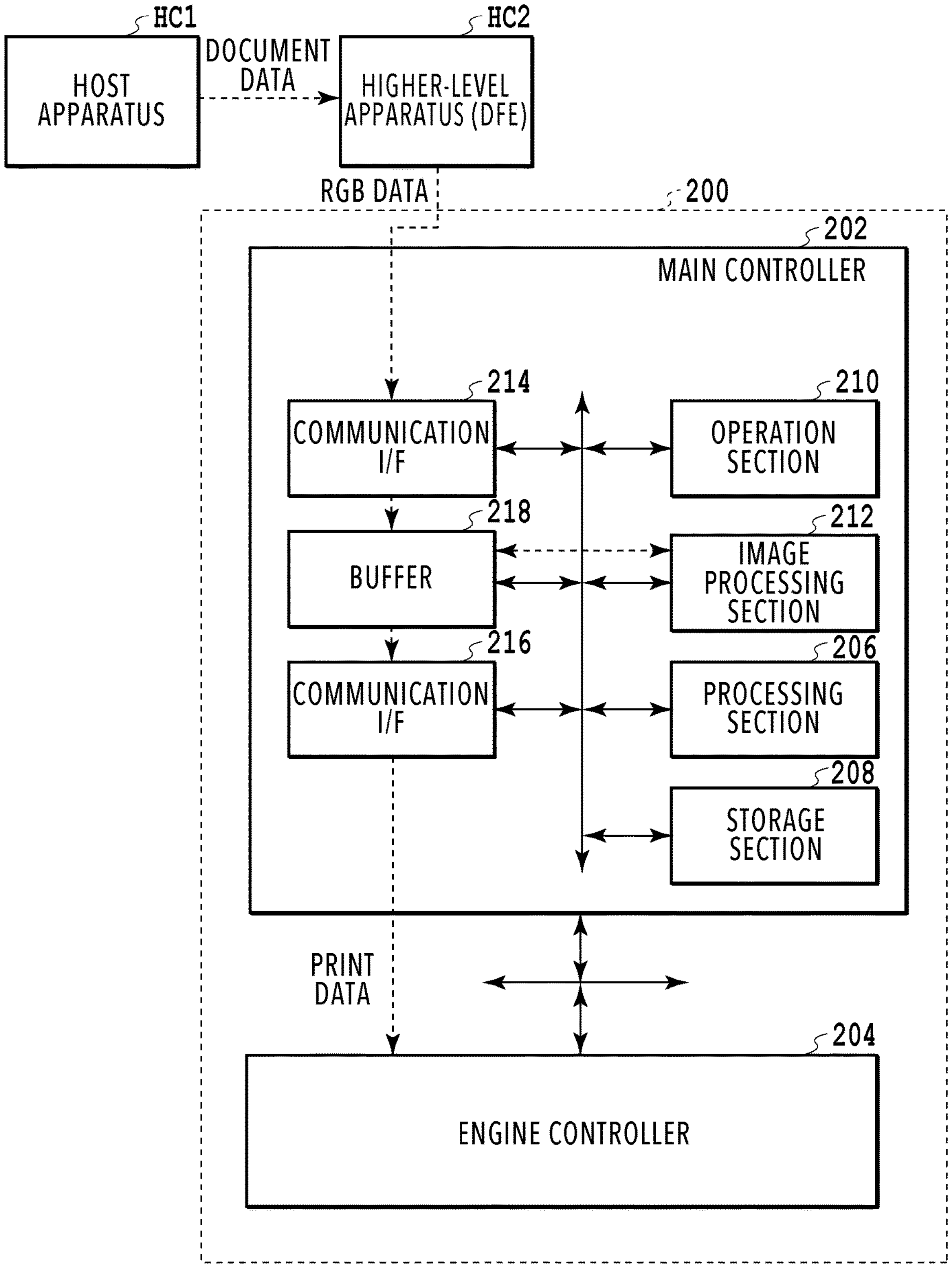
FIG. 2 is a block diagram showing a configuration of a control system of the printing apparatus.

Next, a configuration of a control system of the printing apparatus 10 will be described. FIG. 2 is a block diagram showing the configuration of the control system of the printing apparatus 10. The printing apparatus 10 is communicably connected to a higher-level apparatus (DFE) HC2 and the higher-level apparatus (DFE) HC2 is communicably connected to a host apparatus HC1. The host apparatus HC1 generates or stores document data to be the basis for a printed image. The document data is generated, for example, in the format of an electronic file such as a text file or an image file. The document data is transmitted from the host apparatus HC1 to the higher-level apparatus HC2. The higher-level apparatus HC2 converts the received document data into a data format usable in the printing apparatus 10, such as RGB data representing an image in RGB. The converted data is transmitted from the higher-level apparatus HC2 to the printing apparatus 10.

The control section 200 which controls operation of the entire printing apparatus 10 comprises a main controller 202 and an engine controller 204. The main controller 202 comprises a processing section 206, a storage section 208, an operation section 210, an image processing section 212, communication interfaces (I/F) 214 and 216, and a buffer 218.

The processing section 206 is implemented by a processor such as a CPU to execute programs stored in the storage section 208 and control the whole of the main controller 202. The storage section 208 is implemented by a storage device such as a ROM, RAM, hard disk, or SSD to store data and programs executed by the processing section 206 and provide the processing section 206 with a work area. The operation section 210 is an input device such as a touch panel, keyboard, or mouse to accept instructions from a user.

The buffer 218 is a storage area implemented by, for example, a RAM, hard disk, or SSD to store various kinds of information. The image processing section 212 is implemented by, for example, an electronic circuit comprising a processor for image processing and is configured to execute image processing for image data (RGB data) input from the higher-level apparatus HC2. The communication I/F 214 communicates with the higher-level apparatus HC and the communication I/F 216 communicates with the engine controller 204. Incidentally, the control section 200 comprises one processing section 206, one storage section 208, and one image processing section 212 here, but may comprise two or more of each of these sections. The configuration of the engine controller 204 will be described later.

The dotted arrows in FIG. 2 show an example of flow of data input to the control section 200. Image data (RGB data) received from the higher-level apparatus HC2 via the communication I/F 214 is accumulated in the buffer 218. The image processing section 212 reads the image data from the buffer 218, applies predetermined image processing to the read image data to produce print data for use in the engine controller 204, and stores the data in the buffer 218 again. The print data stored in the buffer 218 is transmitted from the communication I/F 216 to the engine controller 204. After that, the print head 26 is driven by the engine controller 204 based on the print data to perform a printing operation of executing printing on a print medium.

Image Processing

Figure 3:
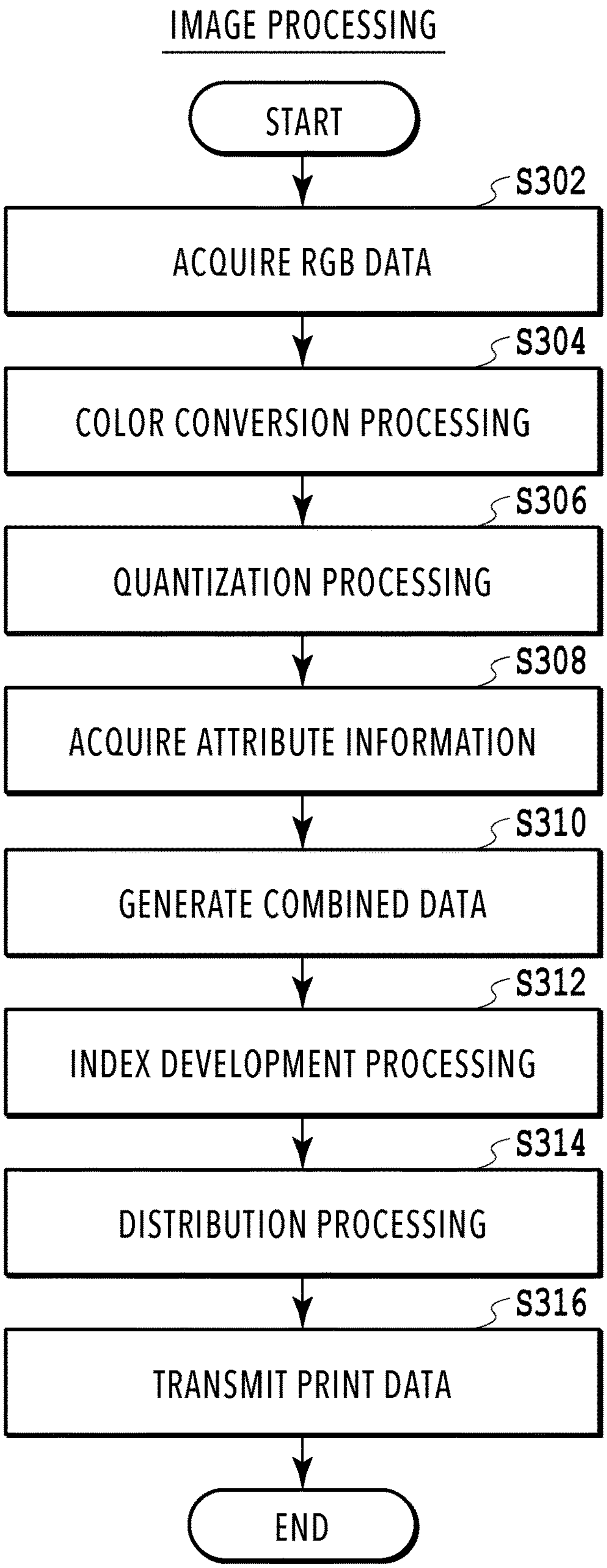
FIG. 3 is a flowchart showing detailed processing contents of image processing.

Next, the image processing executed in the image processing section 212 will be described. FIG. 3 is a flowchart showing detailed processing contents of the image processing executed in the image processing section 212. The procedure shown in the flowchart of FIG. 3 is executed by a CPU of the main controller 202 loading a program code stored in a ROM of the main controller 202 into a RAM of the main controller 202 and executing the program code. Alternatively, part or all of the functions of steps in FIG. 3 may be executed by hardware such as an ASIC or electric circuit. Sign S in the description of each process herein means a step in the flowchart.

If the image processing is started, in S302, the image processing section 212 first acquires RGB data (image data) stored in the buffer 218. In the present embodiment, it is assumed that RGB data comprises 8 bits of each of R, G, and B and has a data resolution of 600 dpi×600 dpi. Next, in S304, the image processing section 212 executes color conversion processing of converting the RGB data into CMYK data corresponding to the ink colors printable in the printing apparatus 10. Through the color conversion processing, CMYK data comprising 12 bits of each of C, M, Y, and K is generated.

After that, in S306, the image processing section 212 performs quantization processing for the CMYK data to generate quantization data comprising 3 bits of each of C, M, Y, and K. For the quantization processing, for example, a dithering method or error diffusion method may be used. In the present embodiment, quantization data having a data resolution of 600 dpi is generated through the quantization processing. In S308, the image processing section 212 acquires attribute information. The attribute information is information indicating whether an attribute of an image to be printed for a pixel is a character attribute or thin line attribute, or another attribute (such as an image picture attribute), and comprises 1 bit. More specifically, if a character or thin line is printed in a pixel, "1" is acquired as attribute information. On the other hand, if an object other than a character or thin line is printed, "0" is acquired as attribute information.

Incidentally, S306 may be executed concurrently with the processing from S302 to S306. Further, although the attribute information is acquired separately from the RGB data in the present embodiment, the processing is not limited to this; the image processing section 212 may acquire the RGB data and the attribute information combined with each other.

If the quantization data and the attribute information are acquired, in S310, the image processing section 212 combines the quantization data of 3 bits for each of C, M, Y, and K with the attribute information of 1 bit to generate combined data comprising 4 bits for each of C, M, Y, and K. The generated combined data has the same data resolution as the quantization data, 600 dpi×600 dpi. In S312, the image processing section 212 performs index development processing for the combined data to generate data comprising information of 1 bit of each of C, M, Y, and K and attribute information for two planes. In the index development, the quantization data of 3 bits of each of C, M, Y, and K having a resolution of 600 dpi×600 dpi of the combined data is developed into 1 bit of each of C, M, Y, and K in a resolution of 1200 dpi×1200 dpi using an index pattern.

After that, in S314, the image processing section 212 performs distribution processing of distributing the developed data to the print heads 26 ejecting different inks and generates print data for use in printing. The generated print data is data having 1 bit of each of C, M, Y, and K and a resolution of 1200 dpi×1200 dpi and indicating ejection/non-ejection of ink. In S316, the image processing section 212 transmits the generated print data to the buffer 218 and finishes the image processing.

Configuration of Print Head

Figure 4A:
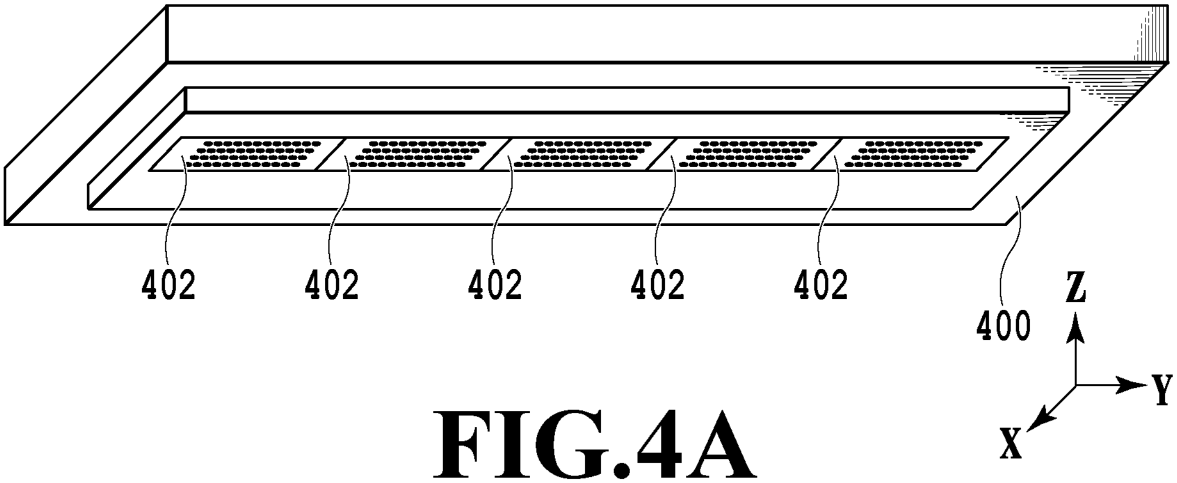
FIGS. 4A to 4C are perspective views of a nozzle surface of a print head.
Figure 4B:
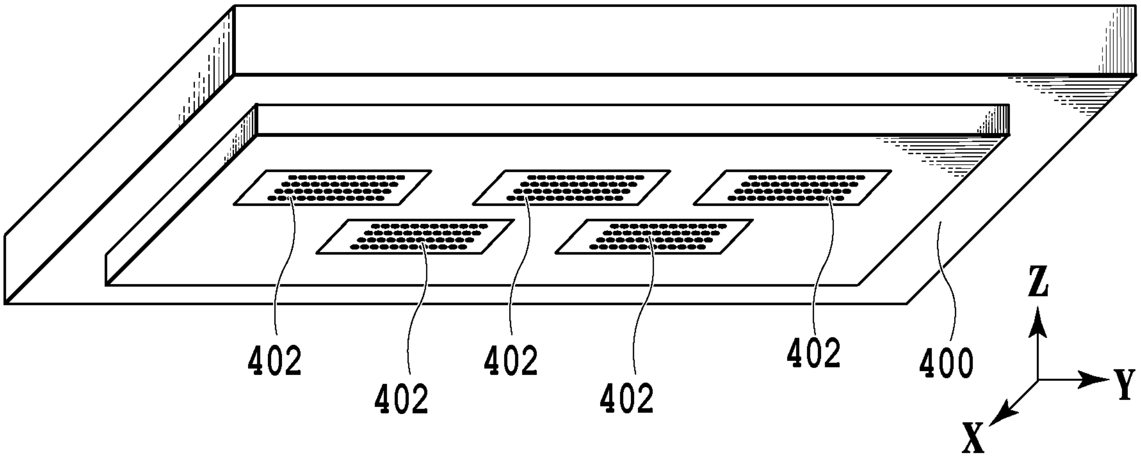
Figure 4C:
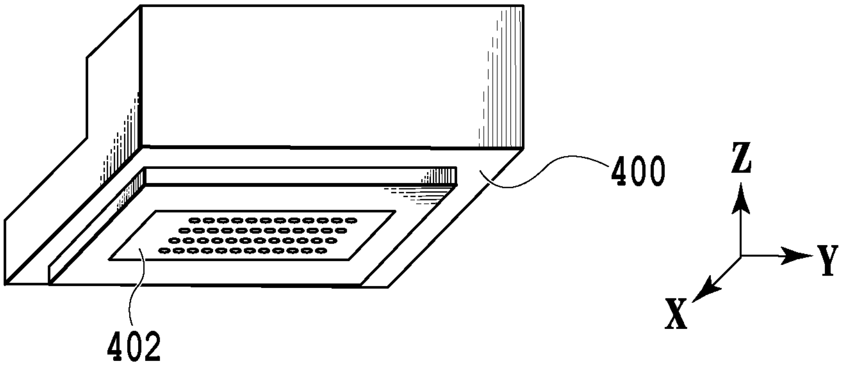

Next, a configuration of the print head 26 will be described. FIGS. 4A to 4C are diagrams showing a configuration of a surface of the print head 26 in which nozzles are formed.

A surface (nozzle surface) 400 of the print head 26 facing a conveyed print medium is provided with a plurality of printing element boards 402. The printing element boards 402 may be arrayed in a line in the extending direction of the print head 26 (see FIG. 4A) or may be arranged in a staggered arrangement in the extending direction of the print head 26 (see FIG. 4B). Alternatively, the print head 26 may comprise only one printing element board 402 (see FIG. 4C).

Figure 6:
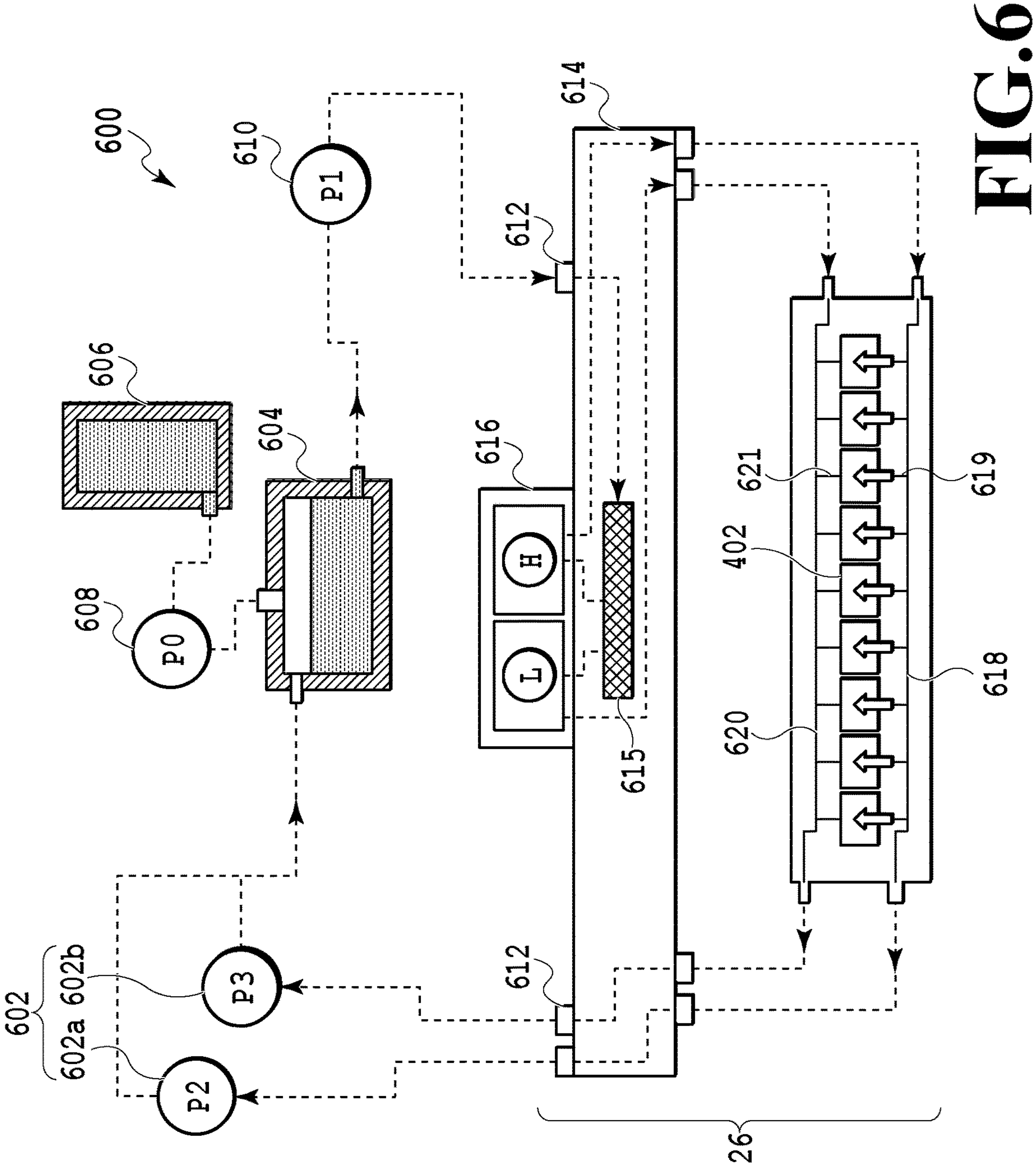
FIG. 6 is a schematic diagram showing a circulation path for ink in the printing apparatus.

The print head 26 also comprises a negative pressure control unit 616 which controls a pressure (negative pressure) inside a circulation path for ink (described later) in the printing apparatus 10 including the print head 26 and an ink supply unit 614 in fluid communication with the negative pressure control unit 616 (see FIG. 6). The print head 26 also comprises liquid connection sections 612 to be a supply port and a discharge port for ink in the ink supply unit 614 (see FIG. 6).

Configuration of Printing Element Board

Figure 5A:
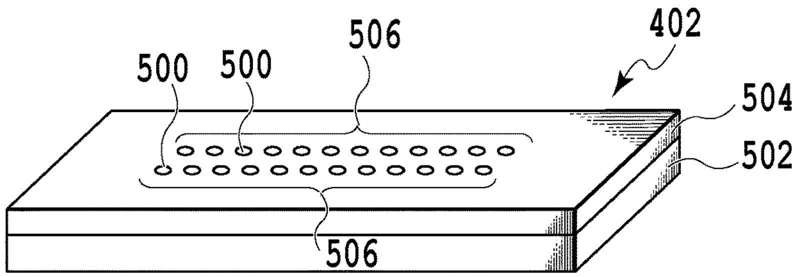
FIGS. 5A to 5C are diagrams illustrating a configuration of a printing element board.
Figure 5B:
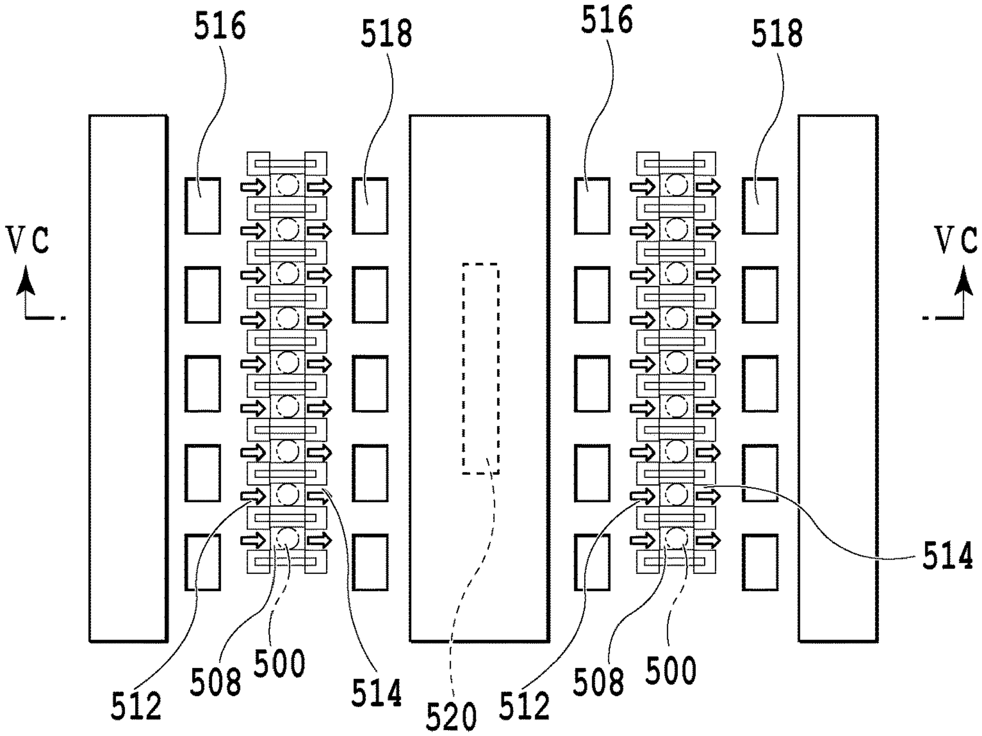
Figure 5C:
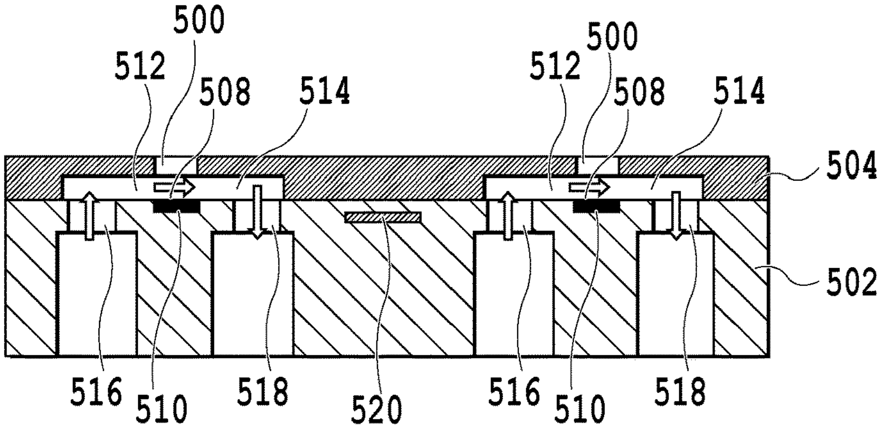

Next, a configuration of the printing element board 402 will be described. FIGS. 5A to 5C are diagrams schematically illustrating the configuration of the printing element board; FIG. 5A is a perspective view of the whole, FIG. 5B is a partial enlarged transparent view of the internal configuration, and FIG. 5C is a cross-sectional view along VC-VC line in FIG. 5B.

The printing element board 402 comprises a substrate 502 and an orifice plate 504 formed on one surface of the substrate 502. The substrate 502 is preferably formed of a material such as a processable semiconductor substrate. The use of this material makes it possible to arrange a plurality of electronic devices such as energy generating elements, electric circuits, electric wiring lines, and temperature sensors on the surface of the substrate 502. The orifice plate 504 is formed of a material such as a resin substrate in which nozzles 500 can be formed by laser processing or an inorganic plate in which nozzles 500 can be formed by dicing. The orifice plate 504 may be formed of a material such as a photosensitive resin material in which nozzles 500 and ink flow paths can be formed by photo curing. Alternatively, various publicly-known materials may be used; for example, a semiconductor substrate may be used like the substrate 502 and nozzles 500 and ink flow paths may be formed by MEMS processing.

The orifice plate 504 has a nozzle array 506 in which a plurality of nozzles 500 for ink ejection are arrayed in the extending direction of the substrate 502. The orifice plate 504 forms a plurality of pressure chambers 508 together with one surface of the substrate 502 (see FIGS. 5B and 5C). The nozzles 500 communicate with the respective pressure chambers 508. Each pressure chamber 508 is provided with an energy generating element 510 which generates energy for liquid ejection (see FIG. 5C). The energy generating element 510 is provided on the substrate 502. The nozzle 500 formed in the orifice plate 504 is positioned to face the energy generating element 510.

As the energy generating element 510, various publicly-known elements may be used, such as a heating element (electrothermal transducing element) or a piezoelectric element. In a case where a heating element is used as the energy generating element 510, the heating element brings ink to a boil in the pressure chamber 508 and the bubble generating energy at the boil is used to eject ink from the nozzle 500.

In the pressure chamber 508, an incoming flow path 512 through which ink flows into the pressure chamber 508 is formed on one side in a direction intersecting the extending direction of the nozzle array 506 and an outgoing flow path 514 through which ink flows out of the pressure chamber 508 is formed on the other side in that direction.

In the substrate 502, on one side in the direction intersecting the extending direction of the nozzle array 506, a plurality of supply ports 516 are arrayed in that extending direction to supply ink to the incoming flow paths 512 (see FIG. 5C). On the other side in the direction intersecting the extending direction of the nozzle array 506, a plurality of collection ports 518 are arrayed in that extending direction to collect ink from the outgoing flow paths 514. The supply ports 516 and the collection ports 518 are through holes penetrating from one surface to the other surface of the substrate. The substrate 502 also comprises a temperature detecting section 520 capable of detecting temperature between two nozzle arrays 506. The temperature of ink in the printing element board 402 is detected by the temperature detecting section 520. Although not illustrated, the printing element board 402 is provided with a temperature adjustment heater capable of adjusting the surface temperature of the nozzle surface 400 of the print head 26 to a set temperature.

Circulation Path

Next, a circulation path for ink in the printing apparatus 10 will be described. FIG. 6 is a schematic diagram of the circulation path for ink in the printing apparatus 10.

In a circulation path 600 for ink provided in the printing apparatus 10, the print head 26 is fluidly connected to a first circulation pump 602, a buffer tank 604, and the like. That is, the circulation path 600 is formed independently for each kind of ink (processing liquid). Since the circulation paths 600 corresponding to the respective inks have the same configuration, the following description will describe the circulation path 600 including the print head 26 which ejects the K ink.

The buffer tank 604 comprises an air communication port (not shown) which establishes communication between the inside and outside of the buffer tank 604, whereby bubbles in ink in the buffer tank 604 can be discharged to the outside. The buffer tank 604 is connected to the main tank 606 and a replenishing pump 608 is provided between the buffer tank 604 and the main tank 606. The replenishing pump 608 supplies ink in the main tank 606 to the buffer tank 604. For example, in a case where an amount of ink circulating through the circulation path 600 is reduced by a printing operation for a print medium, a maintenance operation for the print head 26, and the like, the replenishing pump 608 is controlled so that ink is transferred from the main tank 606 to the buffer tank 604 to make up for the reduction.

Ink in the buffer tank 604 is supplied to the ink supply unit 614 of the print head 26 by a second circulation pump 610 through the liquid connection section 612. The ink supplied to the ink supply unit 614 is adjusted to have two different negative pressures (high and low pressures) in the negative pressure control unit 616 connected to the ink supply unit 614 through a filter 615, divided into two flow paths, a high-pressure side flow path and a low-pressure side flow path, and supplied to the printing element board 402.

Ink flowing through the high-pressure side flow path is supplied to a common supply flow path 618 through which ink is supplied to each printing element board 402. Ink flowing through the low-pressure side flow path is supplied to a common collection flow path 620 into which ink is collected from the printing element boards 402. Due to the pressure difference between the common supply flow path 618 and the common collection flow path 620, part of ink supplied to the common supply flow path 618 flows into the printing element board 402 through an individual supply flow path 619. The ink that has flowed into the printing element board 402 flows sequentially through the supply port 516, the incoming flow path 512, the pressure chamber 508, the outgoing flow path 514, and the collection port 518 and then flows into the common collection flow path 620 through an individual collection flow path 621.

Here, the first circulation pump 602 comprises a high-pressure side first pump 602*a* and a low-pressure side second pump 602*b*. The first pump 602*a* is connected to the common supply flow path 618 through the ink supply unit 614 and the second pump 602*b* is connected to the common collection flow path 620 through the ink supply unit 614. Accordingly, ink is collected from the print head 26 to the buffer tank 604 through the first circulation pump 602. That is, ink in the common supply flow path 618 that has not flowed to the printing element board 402 is collected to the buffer tank 604 by the first pump 602*a* through the ink supply unit 614 and the liquid connection section 612. Further, ink flowing out of the common collection flow path 620 is collected to the buffer tank 604 by the second pump 602*b* through the ink supply unit 614 and the liquid connection section 612.

It is preferable that the first circulation pump 602 (that is, the first pump 602*a* and the second pump 602*b*) be a displacement pump having a quantitative liquid delivery capability. More specifically, it is preferable to use a tube pump, gear pump, diaphragm pump, syringe pump, and the like as the first circulation pump 602. However, the first circulation pump 602 may be configured to secure a constant flow rate by, for example, providing a common constant flow valve or relief valve in the outlet of the pump.

In a case where the print head 26 is driven, the first circulation pump 602 is driven such that ink flows at a predetermined flow rate through each of the common supply flow path 618 and the common collection flow path 620. By this ink flow, the temperature of the print head 26 in printing is maintained at an optimal temperature. The above predetermined flow rate is set at such a flow rate that a temperature difference among the printing element boards 402 of the print head 26 can be maintained at a temperature difference that does not affect the quality of a printed image. Incidentally, in a case where the flow rate is set at a too high value, a negative pressure difference among the printing element boards 402 is increased under the influence of pressure loss in the common supply flow path 618, the common collection flow path 620, and the like and density unevenness occurs in a printed image. Thus, the above predetermined flow rate is set in consideration of the temperature difference and negative pressure difference among the printing element boards 402.

The buffer tank 604 may be provided with a heating section to control the temperature of ink circulating through the circulation path 600 or may be provided with a deaerator section for removal of a gas dissolved in the ink. For example, it is assumed that an amount of ink circulating through the circulation path 600 including the buffer tank 604 is 2180 g.

The negative pressure control unit 616 is provided in a path between the second circulation pump 610 and the printing element board 402. Even in a case where a flow rate of ink in the circulation path 600 is changed by a difference in ejection amount per unit area or the like, the negative pressure control unit 616 operates so that a pressure on the downstream side of the negative pressure control unit 616 (on the printing element board 402 side) is maintained at a predetermined constant pressure. The upstream side of the negative pressure control unit 616 is pressurized by the second circulation pump 610. This configuration can reduce the influence of water head pressure of the buffer tank 604 on the print head 26 and thereby increase the flexibility of layout of the buffer tank 604 in the printing apparatus 10.

The second circulation pump 610 may be any pump having a pump head pressure equal to or greater than a certain pressure within a range of an ink circulation flow rate for use in driving of the print head 26. For example, a turbopump or a displacement pump can be used. More specifically, a diaphragm pump or the like can be used as the second circulation pump 610.

As described above, in the circulation path 600, circulating ink passes through each printing element board 402. Thus, heat generated in each printing element board 402 can be discharged to the outside of the printing element board 402 by ink flowing through the common supply flow path 618 and the common collection flow path 620. Further, this configuration can produce ink flow also in the nozzle 500 which does not perform ejection while the print head 26 performs printing. Accordingly, such ink flow can suppress ink thickening in the nozzle 500 and maintain good ink ejection performance of the print head 26.

Processing in Printing

Figure 7:
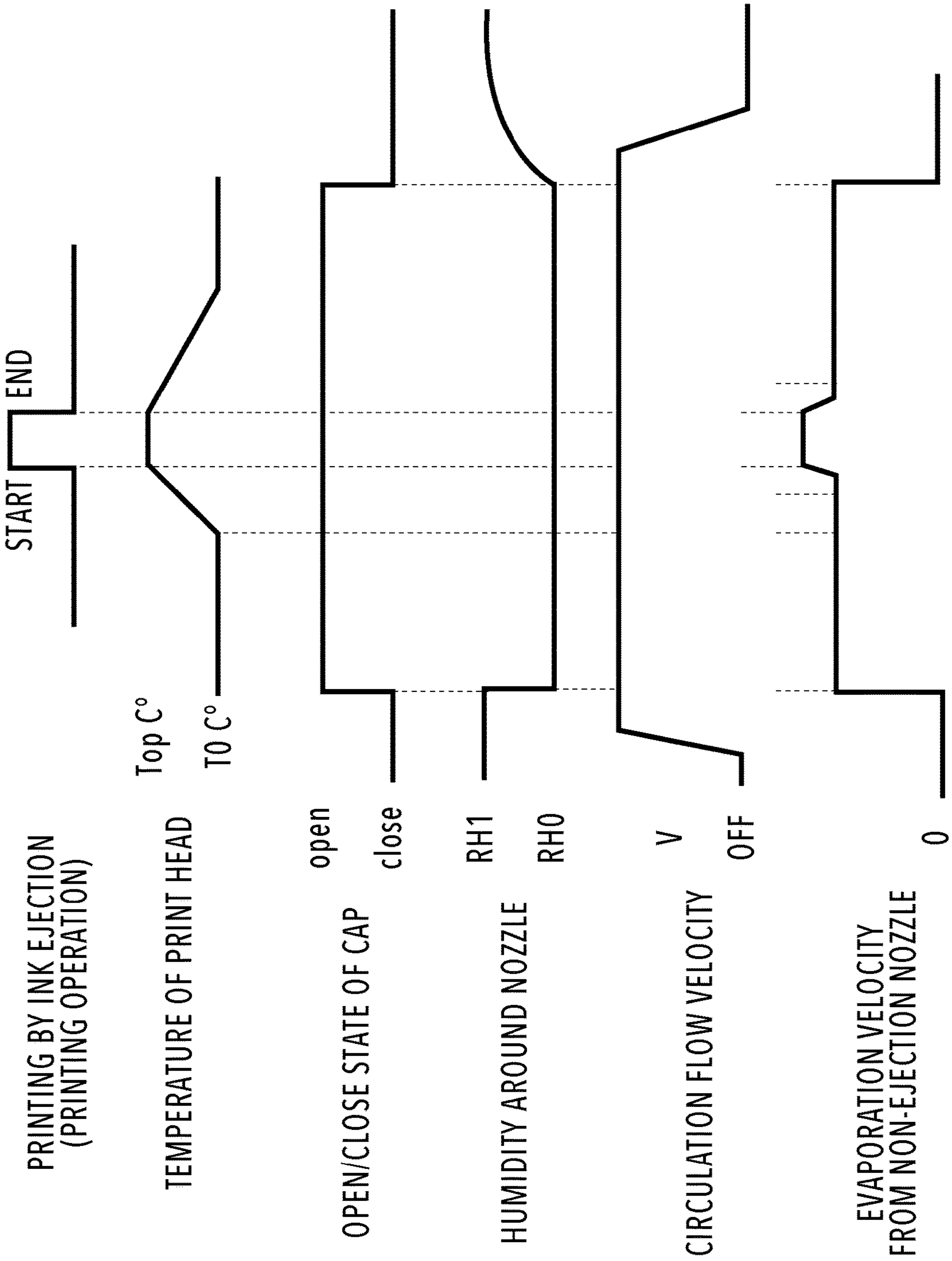
FIG. 7 is a timing chart of each process executed at the time of printing.

Next, processing executed in printing by the printing apparatus 10 will be described. FIG. 7 is a timing chart of a plurality of processes executed in printing by the printing apparatus 10. In the following description, a state of the printing apparatus 10 before execution of a printing operation based on a job is referred to as a standby state as appropriate. While the printing apparatus 10 is in a standby state, the first circulation pump 602 and the second circulation pump 610 are inactive and ink does not circulate through the circulation path 600. It is assumed that the temperature of the print head 26 is T0° C. and the humidity in the nozzles 500 is RH1 in the standby state.

In a case where a printing operation is started based on a job in the printing apparatus 10, the engine controller 204 drives the first circulation pump 602 and circulates ink through the circulation path 600. Next, the cap section (not shown) of the maintenance section 28 is separated from the nozzle surface 400 of the print head 26 and the nozzles 500 are exposed to the outside. The humidity around the nozzle 500 is thus equalized with the humidity of an environment in which the printing apparatus 10 is installed (RH0) and ink starts evaporating from the nozzles 500. After that, the temperature adjustment heater (not shown) provided in the printing element board 402 is driven and the printing element board 402 is heated to a temperature necessary for the printing operation. After the ink flow velocity (circulation flow velocity) in the circulation path 600 reaches a predetermined velocity V and the temperature of the printing element board 402 reaches a predetermined temperature Top° C., the printing operation of performing printing on a print medium is executed.

The velocity of ink evaporation from the nozzles 500 increases abruptly with the separation of the cap section. During the printing operation, ink evaporates mainly from a non-ejection nozzle which does not eject ink. The evaporation of ink from the non-ejection nozzle causes an increase of the ink concentration in the circulation path 600. Since the circulation flow velocity cannot be controlled for each nozzle 500, the velocity of ink evaporation from one non-ejection nozzle is constant during the printing operation. Incidentally, a component evaporated from the non-ejection nozzles has a dominant position in the ink evaporation from the nozzles during the printing operation. In the present embodiment, however, the ink evaporation amount is calculated based on the assumption that ink evaporation progresses uniformly in all the nozzles irrespective of the ejection state to simplify the calculation.

After the printing operation is finished, the first circulation pump 602 is deactivated and ink stops circulating through the circulation path 600. The circulation flow in the nozzles 500 stops completely a predetermined period after the deactivation of the first circulation pump 602. Accordingly, the velocity of evaporation from the non-ejection nozzles decreases abruptly after the deactivation of the first circulation pump 602. After that, the cap section is brought into contact with the nozzle surface 400 of the print head 26. The humidity around the nozzles 500 thus increases and returns to the humidity RH1 before the execution of the printing operation by the job and the velocity of evaporation from the non-ejection nozzles converges at 0.

Adjustment Processing

In the configuration described above, the printing apparatus 10 executes adjustment processing of adjusting the ink concentration (for example, pigment concentration) in the circulation path raised by the printing operation to such a concentration that the quality of a printed image does not deteriorate.

More specifically, at a timing before or after execution of a printing operation based on a job, the printing apparatus 10 first executes acquisition processing of acquiring an estimated value of a concentration of ink in the circulation path 600 thickened by the printing operation based on the job. After that, based on the acquired estimated value of the ink concentration, the printing apparatus 10 executes adjustment processing of discharging part of the thickened ink from the circulation path 600 and supplying new ink from the main tank 606 to adjust the concentration of ink in the circulation path 600. In the description below, the discharge of part of ink from the circulation path 600 and the supply of new ink to the circulation path 600 are collectively referred to as ink discharge control as appropriate. Through the adjustment processing, the concentration of ink in the circulation path 600 is adjusted in a predetermined temperature range in which the quality of a printed image is resistant to deterioration. Incidentally, the timing of execution of the adjustment processing (and acquisition processing) is not limited to a timing before or after the execution of a printing operation by a job and may be a timing of a user instruction. The adjustment processing is executed for each type of ink.

Functional Configuration of Engine Controller 204

Figure 8:
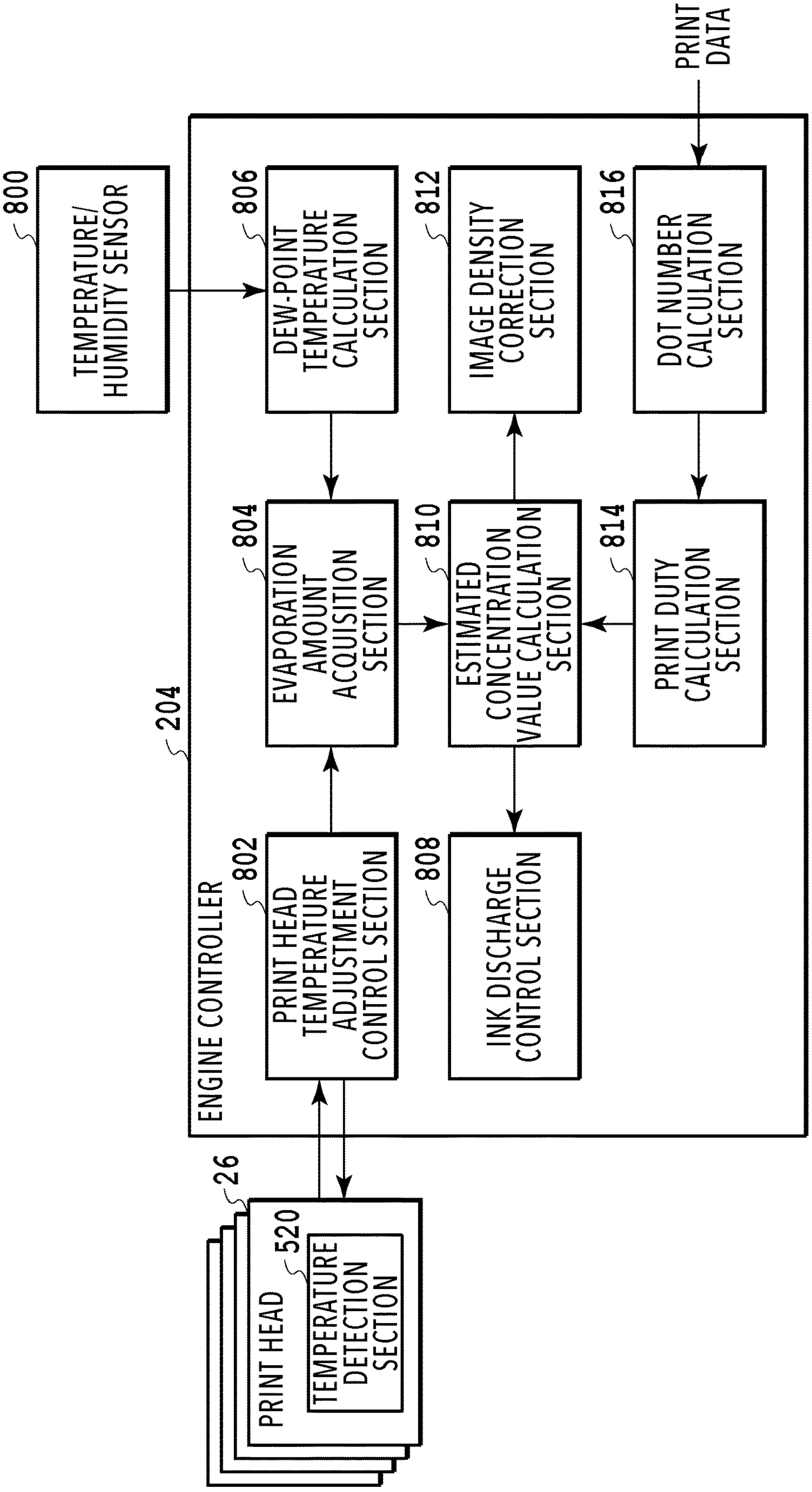
FIG. 8 is a block diagram showing a functional configuration of an engine controller.

The acquisition processing and the adjustment processing are executed by the engine controller 204. FIG. 8 is a block diagram showing a functional configuration of the engine controller 204. Each feature of the engine controller 204 shown in FIG. 8 is implemented by publicly-known hardware such as the CPU, ROM, and RAM provided in the engine controller 204.

The engine controller 204 comprises a print head temperature adjustment control section 802 which controls the adjustment of the temperature of the print head 26 by the temperature adjustment heater (not shown) provided in the printing element board 402 based on the result of detection by the temperature detecting section 520 provided in the printing element board 402. The engine controller 204 also comprises an evaporation amount acquisition section 804 which acquires an amount of evaporation per unit time from the nozzles 500. The engine controller 204 also comprises a dew-point temperature calculation section 806 which calculates a dew-point temperature around the nozzle surface 400 of the print head 26 based on the result of detection by a temperature/humidity sensor 800 provided in the printing apparatus 10. The temperature/humidity sensor 800 is configured to detect the temperature and humidity (relative humidity) of a space between the print head 26 and a print medium.

The engine controller 204 comprises an ink discharge control section 808 which controls ink discharge from the circulation path 600 and ink supply to the circulation path 600 associated with the discharge. The engine controller 204 also comprises an estimated concentration value calculation section 810 which calculates an estimated value of the concentration of ink in the circulation path 600 and an image density correction section 812 which executes image density correction. The engine controller 204 also comprises a print duty calculation section 814 which calculates a print duty based on the result of calculation by a dot number calculation section 816 described later. The engine controller 204 also comprises the dot number calculation section 816 which calculates the number of ink droplets ejected from the nozzles of the print head 26 based on print data.

Acquisition Processing

Figure 9:
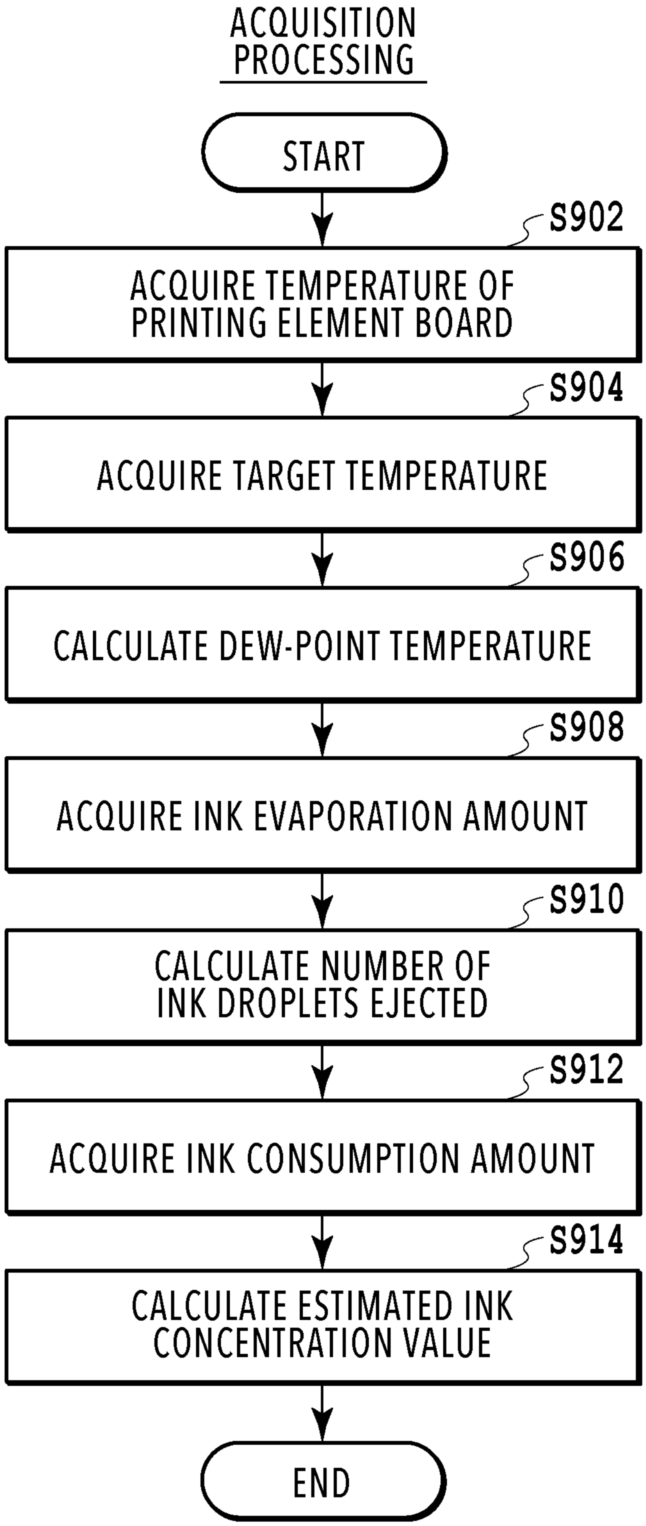
FIG. 9 is a flowchart showing detailed processing contents of acquisition processing.

The printing apparatus 10 executes the acquisition processing at a timing between input of a job and execution of a printing operation or a timing after finish of a printing operation by a job and uses the information acquired in the acquisition processing to execute the adjustment processing. First, the acquisition processing will be described. FIG. 9 is a flowchart showing detailed processing contents of the acquisition processing. The procedure shown in the flowchart of FIG. 9 is executed by the CPU of the engine controller 204 loading a program code stored in the ROM of the engine controller 204 into the RAM of the engine controller 204 and executing the program code. Alternatively, part or all of the functions of steps in FIG. 9 may be executed by hardware such as an ASIC or electric circuit.

If the acquisition processing is started, in S902, the print head temperature adjustment control section 802 first acquires the temperature of each printing element board 402. More specifically, the print head temperature adjustment control section 802 acquires the result of detection by the temperature detecting section 520 provided in each printing element board 402. The acquisition is executed, for example, in a cycle of 200 msec. In this case, for example, the acquisition can be executed about four times for one A4-size print medium conveyed at a conveying speed of 0.6765 mm/sec. In S904, the print head temperature adjustment control section 802 acquires a target temperature for temperature adjustment control of the printing element boards 402 in the print head 26. In the present embodiment, the highest temperature among the temperatures of the respective temperature detecting sections 520 acquired in S902 is acquired as a target temperature. However, the target temperature may be the average value of the results of detection by the temperature detecting sections 520 or may be the lowest temperature among them.

Next, in S906, the dew-point temperature calculation section 806 acquires the temperature and relative humidity detected by the temperature/humidity sensor 800 and calculates a dew-point temperature using the acquired temperature and relative humidity. In S908, the evaporation amount acquisition section 804 acquires an amount of ink evaporation per unit time from the nozzles based on the dew-point temperature acquired in S906 and the target temperature acquired in S904. A storage area of the engine controller 204 such as the ROM or RAM stores a table showing the ink evaporation amount per unit time corresponding to the combination of the dew-point temperature and the temperature of the printing element board 402 (see FIG. 10). FIG. 10 is a diagram showing an example of the table showing the ink evaporation amount per unit time corresponding to the combination of the dew-point temperature and the temperature of the printing element board 402. Although FIG. 10 shows signs V1 to V40 as the ink evaporation amounts per unit time, numerical values corresponding to the ink evaporation amounts per unit time are actually input here. Accordingly, in S908, the ink evaporation amount per unit time is acquired using the table of FIG. 10.

In S910, the dot number calculation section 816 counts the number of ink droplets ejected from all of the nozzles 500 of the print head 26. In S912, the print duty calculation section 814 calculates a print duty per predetermined time and acquires a consumed amount of ink consumed by the printing operation based on the job. That is, in a case where the acquisition processing is executed before execution of the job, the number of ink droplets ejected from the print head 26 is calculated in S910 based on print data used in a printing operation executed by a job immediately before the job to be executed from now. In S912, a consumed amount of ink in the printing operation executed by the job immediately before the job to be executed from now is acquired. In contrast, in a case where the acquisition processing is executed after execution of the job, the number of ink droplets ejected from the print head 26 is calculated in S910 based on print data used in the printing operation by the executed job. In S912, a consumed amount of ink in the printing operation by the executed job is acquired.

After that, in S914, the estimated concentration value calculation section 810 calculates an estimated ink concentration value in the circulation path 600 based on the evaporation amount acquired in S908 and the consumed amount acquired in S912 and finishes the acquisition processing. Since the technique of acquiring an estimated ink concentration value in the circulation path based on the ink evaporation amount per unit time and the consumed amount of ink consumed in the printing operation is a publicly-known technique, the detailed description thereof is omitted. To simplify the calculation, for example, the estimated concentration value is calculated based on the assumption that the concentration has been made uniform a fixed time period after the ink thickened in the circulation path by the evaporation amount was mixed with un-thickened ink. In this case, although a certain time is actually required for equalization of the concentration of ink thickened by evaporation from the nozzles in the circulation path, a trial calculation is performed on a strict condition with respect to evaporation.

Adjustment Processing

Figure 11:
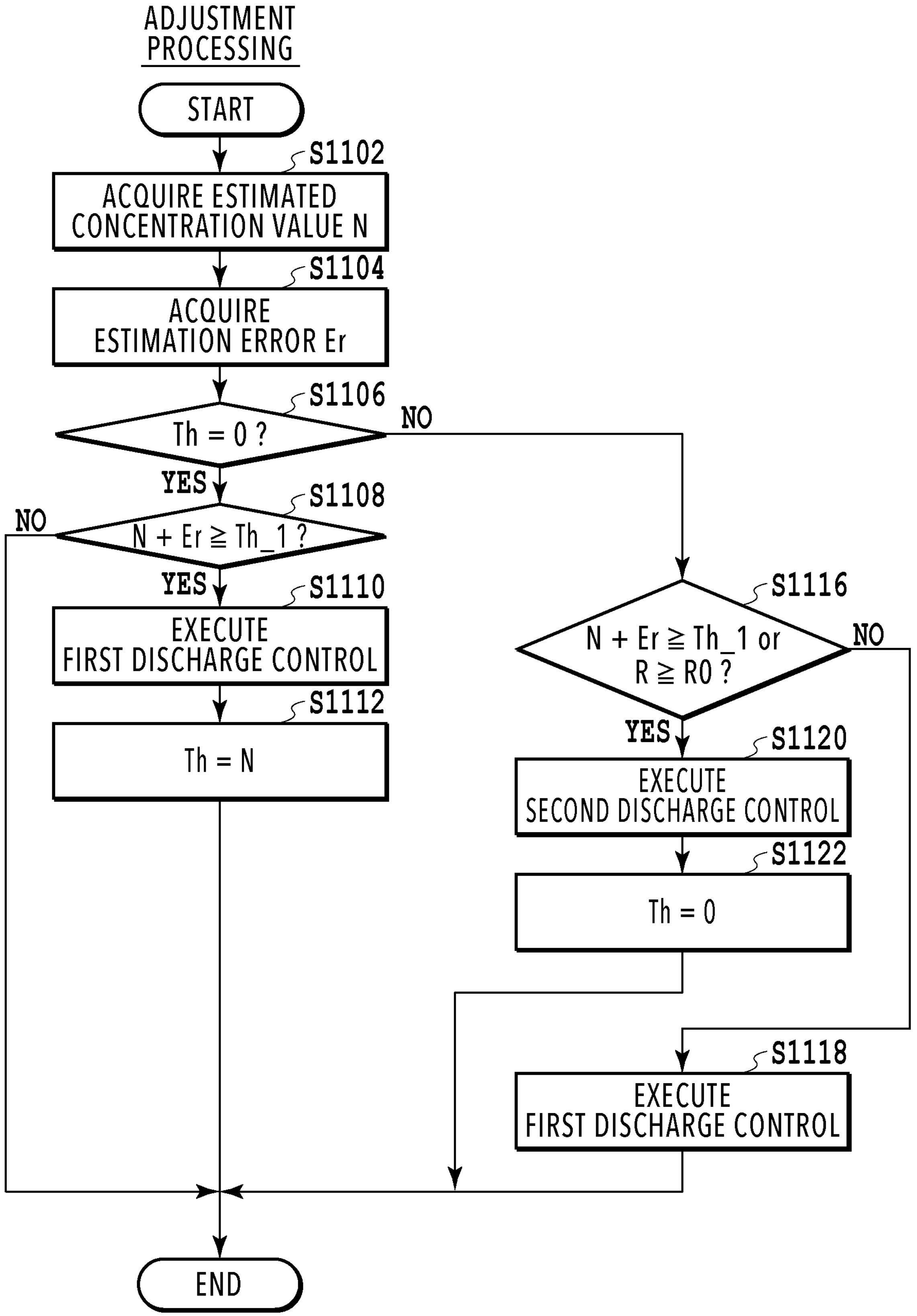
FIG. 11 is a flowchart showing detailed processing contents of adjustment processing.

After the acquisition processing is finished, the adjustment processing of adjusting the ink concentration in the circulation path 600 is executed. The adjustment processing is executed by the ink discharge control section 808 of the engine controller 204. FIG. 11 is a flowchart showing detailed processing contents of the adjustment processing. The procedure shown in the flowchart of FIG. 11 is executed by the CPU of the engine controller 204 loading a program code stored in the ROM of the engine controller 204 into the RAM of the engine controller 204 and executing the program code. Alternatively, part or all of the functions of steps in FIG. 11 may be executed by hardware such as an ASIC or electric circuit.

If the adjustment processing is started, in S1102, the ink discharge control section 808 first acquires an estimated concentration value N acquired in the acquisition processing. In S1104, the ink discharge control section 808 acquires an estimation error Er stored in the storage area of the engine controller 204 such as the ROM or RAM. The estimation error Er is an error that may occur in the estimated value of ink concentration acquired in the acquisition processing and a value experimentally determined and acquired is stored in the storage area. The estimation error Er will be described later.

Next, in S1106, the ink discharge control section 808 determines whether a threshold Th is "0 (initial value)." If it is determined in S1106 that the threshold Th is "0," the process advances to S1108, where the ink discharge control section 808 determines whether the sum of the estimated concentration value N and the estimation error Er is equal to or greater than a limit value (equal to or greater than a limit value Th_1). If it is not determined in S1108 that N+Er≥Th_1, that is, if it is determined in S1108 that the sum of the estimated concentration value N and the estimation error Er is less than the limit value Th_1, the adjustment processing is finished. If it is determined in S1108 that N+Er≥Th_1, the process advances to S1110, where the ink discharge control section 808 executes first discharge control to discharge a small amount of ink from the circulation path 600. Incidentally, the limit value Th_1 is a threshold to determine whether execution of ink discharge is necessary. The limit value Th_1 is calculated by experimentally obtaining a lower limit value of an ink concentration which requires execution of ink discharge control due to an increase in ink concentration in the circulation path 600 and setting the obtained value or a value a predetermined amount smaller than the obtained value as a limit value. The ink concentration which requires execution of ink discharge control is, for example, an ink concentration which causes at least one of the occurrence of density unevenness in a printed image, the deterioration of characteristics of ink ejection from the nozzles, and the decrease in reliability of the ink circulation function in the circulation path.

More specifically, as the first discharge control in S1110, the ink discharge control section 808 discharges a small amount of ink from the circulation path 600 and supplies an amount of ink corresponding to the discharge amount to the circulation path 600. For example, it is assumed that the small amount is 200 g. As the ink discharge from the circulation path 600, for example, preliminary ejection is performed to eject ink not contributing to printing from each nozzle of the print head 26 to the cap section of the maintenance section 28. Alternatively, suction discharge is executed to suck and depressurize the inside of the cap section and forcibly suck ink from each nozzle of the print head 26. However, the method of ink discharge from the circulation path 600 is not limited to this and may use various publicly-known techniques such as ink discharge from the buffer tank 604. In this case, depending on the discharging method, the printing apparatus 10 may have a feature capable of discharging ink stably from the circulation path 600. Further, in S1110, a ratio R0 ($Er_0/N_0$) between an estimated concentration value $N_0$ and an estimation error $Er_0$ at this time is acquired. After that, in S1112, the ink discharge control section 808 sets the threshold Th at the estimated concentration value N and finishes the adjustment processing.

On the other hand, if it is determined in S1106 that the threshold Th is not "0," the process advances to S1116, where the ink discharge control section 808 determines whether at least one of the following two conditions is satisfied: N+Er≥Th1 (condition 1) and R≥R0 (condition 2), where R is a ratio ($Er_t/N_t$) between an estimated concentration value $N_t$ and an estimation error $Er_t$ at this point of time t.

If it is determined in S1116 that neither of conditions 1 and 2 is satisfied, the process advances to S1118 and the ink discharge control section 808 executes the first discharge control to discharge the small amount of ink from the circulation path 600 and then finishes the adjustment processing. A specific processing content of S1118 is the same as that of S1110. If it is determined in S1116 that at least one of conditions 1 and 2 is satisfied, the process advances to S1120, where the ink discharge control section 808 executes second discharge control to discharge a large amount of ink from the circulation path 600.

More specifically, as the second discharge control in S1120, the ink discharge control section 808 discharges a large amount of ink from the circulation path 600 and supplies an amount of ink corresponding to the discharge amount to the circulation path 600. For example, it is assumed that the large amount is 1280 g in consideration of the capacity of the buffer tank 604 and an ink supply operation for the print head 26. This amount is set at, for example, an upper limit value of an amount of ink that can fill the circulation path 600 with ink without the need to execute additional processing even in a case where ink is supplied after ink is discharged from the circulation path 600, or a value a certain amount less than that upper limit value.

After that, the ink discharge control section 808 initializes the threshold Th to "0" in S1122 and then finishes the adjustment processing. The estimated concentration value N satisfying N+Er≥Th_1 may vary within the range of the estimation error Er. Thus, in the present embodiment, the threshold Th set in accordance with the above estimated concentration value N is initialized after the second discharge control to discharge the large amount of ink so that the estimated concentration value N satisfying N+Er≥Th_1 is set as the threshold Th again.

Estimation Error

Next, the estimation error Er acquired in S1104 will be described.

For example, there are the following factors in occurrence of an error in the estimated concentration value.

- Flow velocity around the nozzles (nozzle circulation flow velocity)
- Position of arrangement of the print head 26 in the conveying direction of a print medium
- Moisture absorption into a print medium The estimation error has a positive component and a negative component. The positive component raises the estimated concentration value. The position of arrangement of the print head 26 is basically a positive component but may be a negative component depending on the position in the conveying direction. As the nozzle circulation flow velocity increases, more fresh ink is supplied to the vicinity of the nozzles, which promotes the evaporation from the nozzles. As the moisture absorption into a print medium increases, a space between the print head 26 and the print medium is deprived of more moisture by the print medium, which promotes the evaporation of ink from the nozzles.

Figure 12:
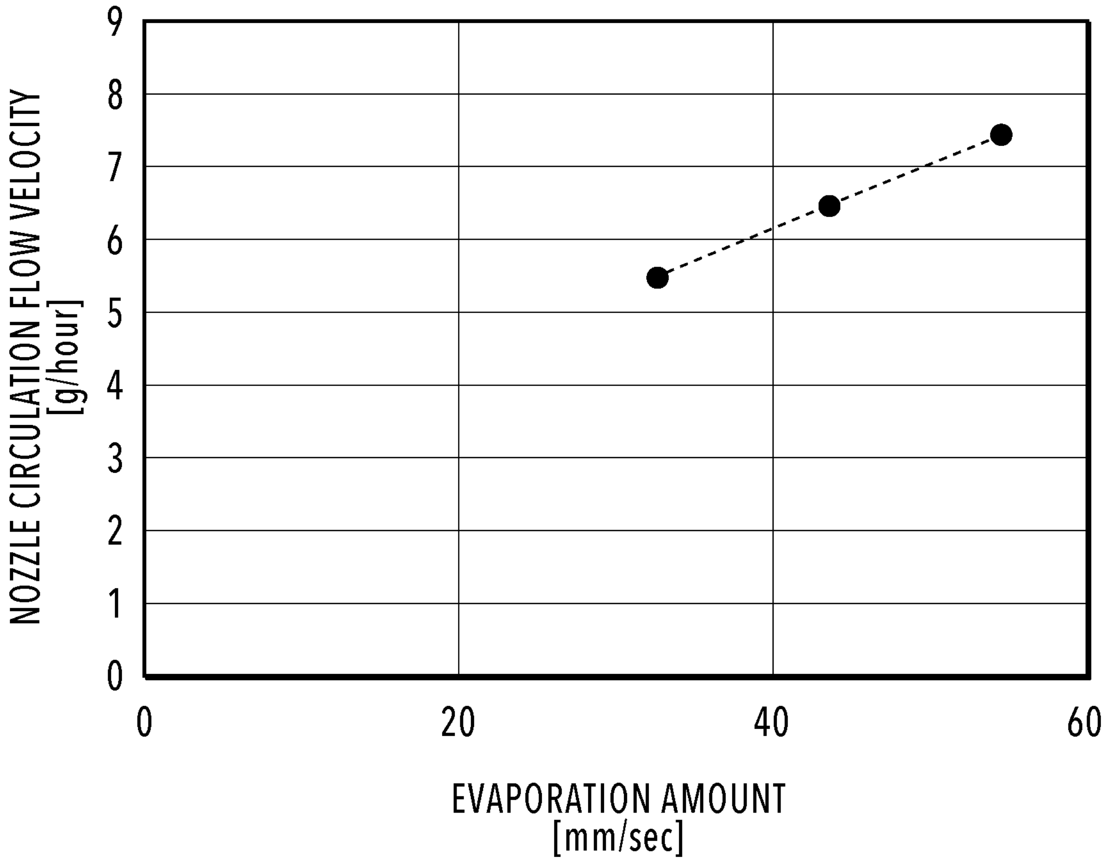
FIG. 12 is a graph showing a relationship between a nozzle circulation flow velocity and an evaporation amount.

FIG. 12 is a graph showing a relationship between the nozzle circulation flow velocity and the evaporation amount in a case where the temperature of the printing element board 402 is 35° C. and the dew-point temperature is 10° C. (temperature: 25° C., relative humidity: 40%). A tolerance median value of the nozzle circulation flow velocity is 45 mm/sec and a tolerance maximum value is 60 mm/sec. From the relationship between the nozzle circulation flow velocity and the evaporation amount shown in FIG. 12, the evaporation amount is 6.83 g/hour with the nozzle circulation flow velocity of 45 mm/sec and the evaporation amount is 8.29 g/hour with the nozzle circulation flow velocity of 60 mm/sec.

An experimental result shows that the moisture absorption into a print medium reduced the dew-point temperature by 2° C. on the worst condition (print duty: 0%). In a case where an increased amount of evaporation corresponding to 2° C. of the dew-point temperature is added to the evaporation amount with the nozzle circulation flow velocity of 60 mm/sec, the evaporation amount is 8.55 g/hour.

Next, an error of the estimated concentration value according to the nozzle circulation flow velocity is calculated by driving the printing apparatus 10 on the following condition with the tolerance median value 45 mm/sec of the nozzle circulation flow velocity and the tolerance maximum value 60 mm/sec of the nozzle circulation flow velocity. In the following description, a state in which the nozzle circulation flow velocity has the tolerance median value 45 mm/sec is referred to as "tolerance median state" as appropriate and a state in which the nozzle circulation flow velocity has the tolerance maximum value 60 mm/sec is referred to as "tolerance maximum state" as appropriate.

- Conveying speed: 0.6765 mm/sec
- Sheet (print medium) size: A4 (297 mm×210 mm)
- Print duty: 0%
- Print time: 1000 hours in a row
- Ink discharge control: executed at the time at which the evaporation rate (the evaporation amount/the amount of ink in the circulation path 600) reaches 10%
- Amount of ink in the circulation path 600: 2180 g In both of the tolerance median state and the tolerance maximum state, the ink discharge control is executed at the time of execution of ink discharge control in the tolerance maximum state. That is, also in the tolerance median state, the ink discharge control is executed at the time at which the evaporation rate reaches 10% in the tolerance maximum state. Since the evaporation amount in the tolerance maximum state (evaporation amount: 8.55 g/hour) is greater than that in the tolerance median state (evaporation amount: 6.83 g/hour), the timing of execution of the ink discharge control is earlier in the tolerance maximum state.

Figure 13:
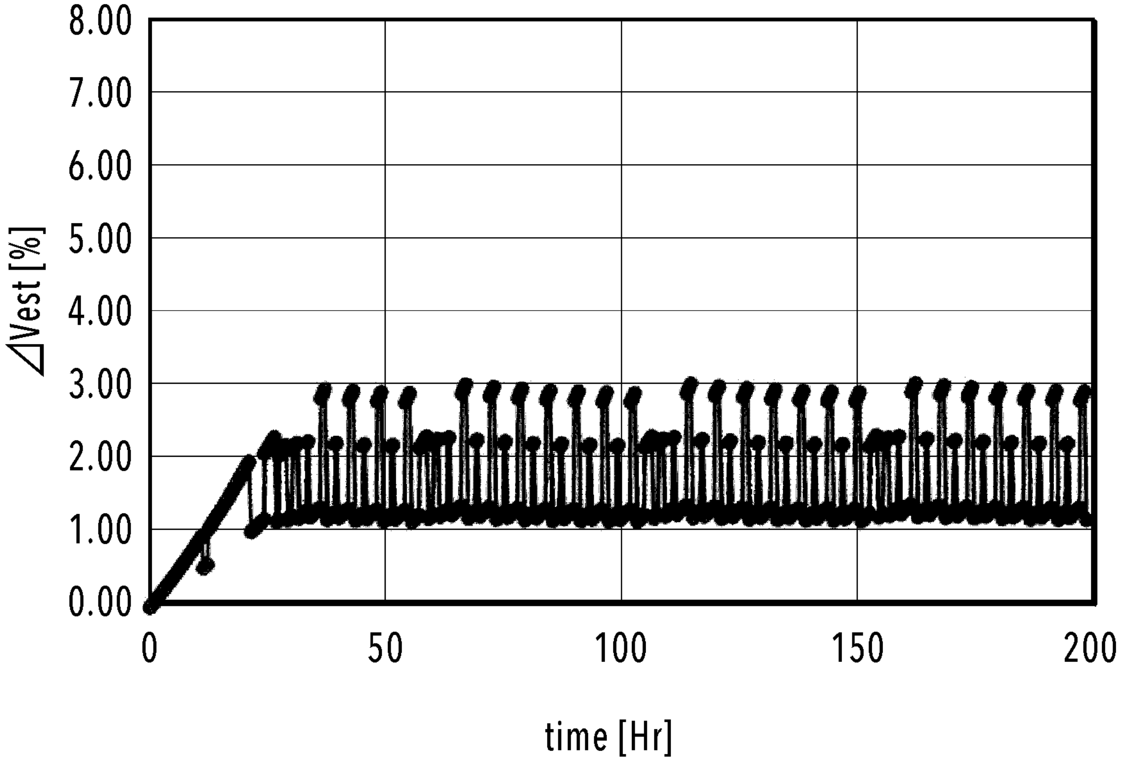
FIG. 13 is a graph showing the progression of an estimation error with a print duty of 0%.

In a case where the printing apparatus 10 is operated on the above condition, a difference in ink evaporation rate between the tolerance maximum state and the tolerance median state relative to the elapsed time is as shown in FIG. 13. FIG. 13 is a graph showing the progression of the estimation error, which is the difference in ink evaporation rate between the tolerance maximum state and the tolerance median state acquired by experiment. As is clear from the graph of FIG. 13, the upper limit value of the difference in evaporation rate is 3%. Based on this experimental result, a concentration value corresponding to the upper limit value 3% of the difference in evaporation rate (concentration error) is set as the estimation error.

In a case where a value of each of the discharge amount of ink, the supplied amount of ink, and the concentration of supplied ink in discharge control is kept constant with high accuracy, the upper limit of the difference in evaporation rate acquired by experiment will never exceed 3%. However, the above values may vary and may be not constant in the product form.

Figure 14:
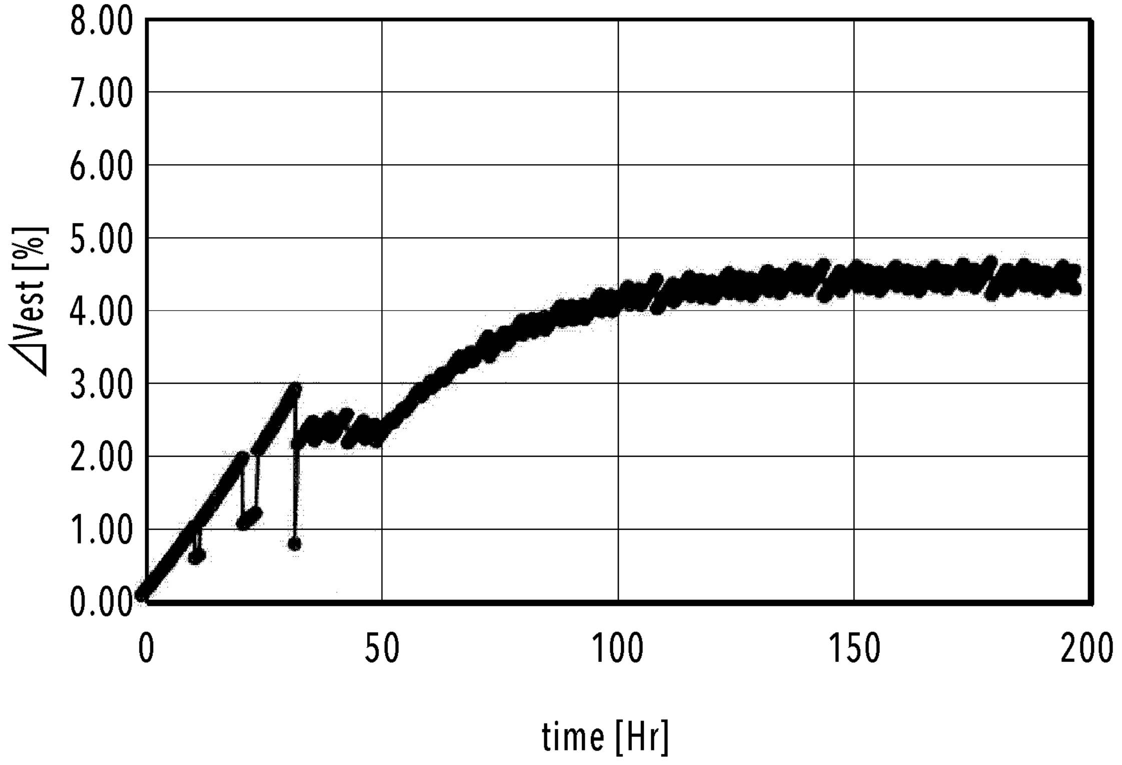
FIG. 14 is a graph showing the progression of an estimation error in a case where an ink of an evaporation rate of 2% is supplied.

For example, in a case where ink of the evaporation rate of 2% is supplied from the main tank 606 on the same condition as the above experiment, the progression of the estimation error is as shown in FIG. 14, where the upper limit value of the difference in evaporation rate is increased. FIG. 14 is a graph showing the progression of the concentration error in a case where ink of the evaporation rate of 2% is supplied in ink discharge control.

Incidentally, it is assumed that the threshold (limit value Th_1) to be compared with the estimated value of ink concentration at the time of determination of execution of ink discharge control is set in consideration of the variations in the above values in the product form. In this case, the threshold is set at a low value, which increases the frequency of execution of ink discharge control and increases the amount of waste ink.

In the present embodiment, ink discharge control is executed in consideration of the error component of the estimated concentration value used to determine execution of ink discharge control. More specifically, in a case where the estimated concentration value exceeds a value in the ink discharge control executed for the first time (discharge control in S1110), the subsequent ink discharge control is executed. In the subsequent ink discharge control, ink discharge control different in ink discharge amount is selectively executed in consideration of the estimation error.

Figure 15:
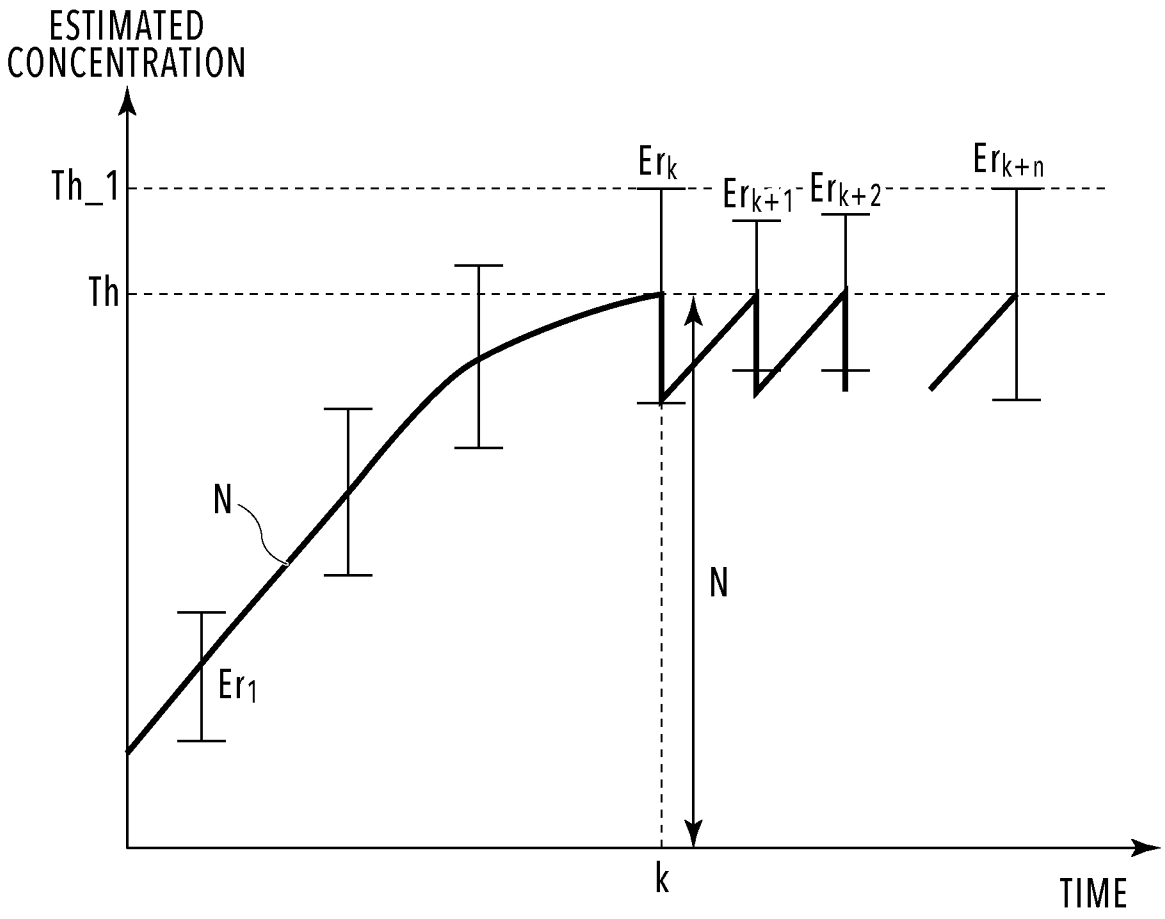
FIG. 15 is a diagram showing changes of an estimated concentration value and an estimation error by ink discharge control.

FIG. 15 is a conceptual diagram showing changes of the estimated concentration value and estimation error by ink discharge control. A solid line indicates the change of the estimated value of ink concentration and each error bar indicates an actual estimation error for the corresponding estimated concentration value. The error bar, or the estimation error, increases with time. Thus, in the present embodiment, in ink discharge control from the second time onward (after the setting of the threshold Th), the second discharge control is executed at the point of time at which the upper limit value of the estimation error is reached.

Figure 25:
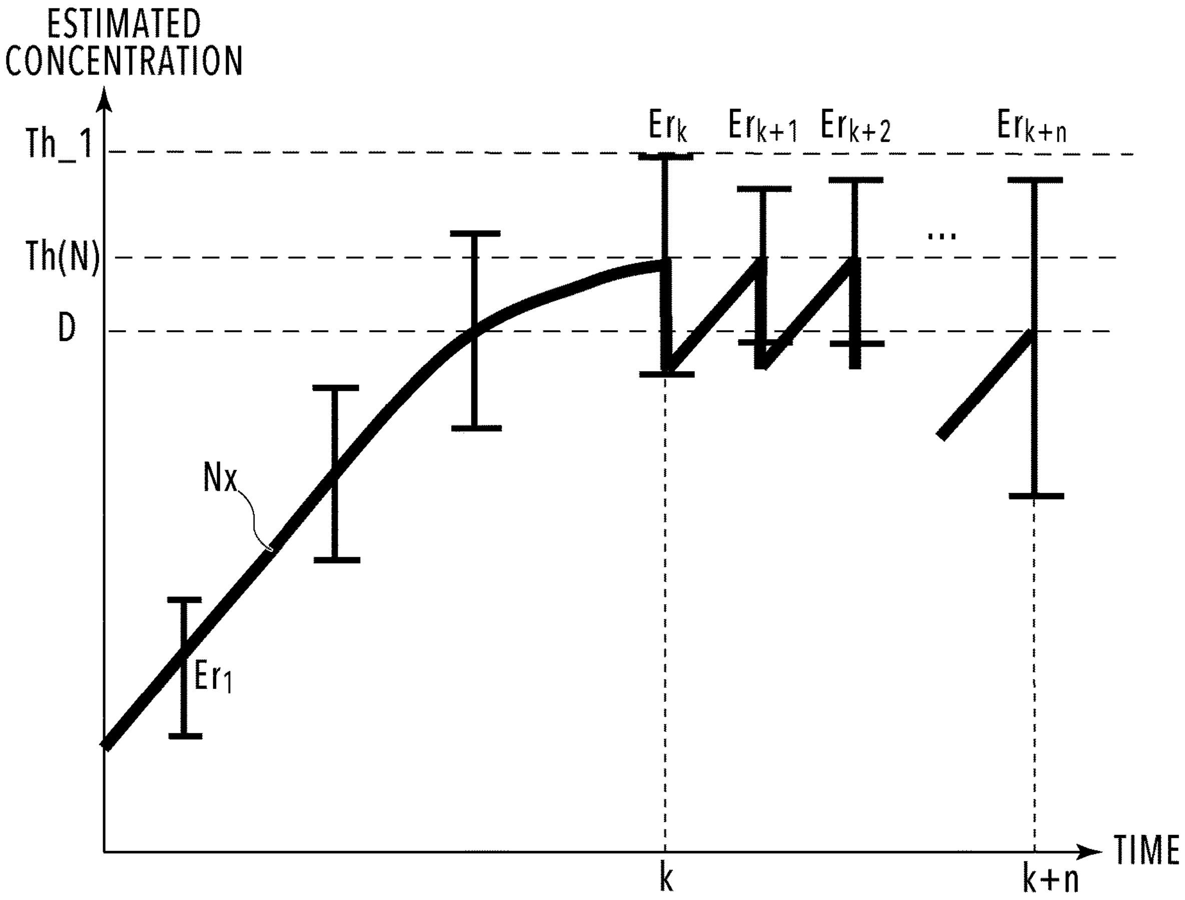
FIG. 25 is a diagram showing changes of an estimated concentration value and an estimation error by ink discharge control.

FIG. 25 is a conceptual diagram showing changes of the estimated concentration value and estimation error by ink discharge control, where the second discharge control is executed by R≥R0. After time k at which the value depending on the estimated concentration value N and the estimation error Er reaches the limit value Th_1, a large estimation error Er is allocated at time k+n by an abnormal operation of some kind, whereby $(Er_{k+n}/D) \geq (Er_k/N)$ and the second discharge control is executed. Incidentally, "D" indicates the estimated concentration value at time k+n. The abnormal operation is, for example, a temperature adjustment abnormality, an operation error of the cap section, or the like.

Effect and Advantage

As described above, in the printing apparatus 10 having the configuration of circulating ink during a printing operation, ink discharge control is executed before or after execution of a job to adjust an ink concentration in the circulation path raised by a printing operation by the latest job. To be more specific, information about the ink concentration in the circulation path such as the estimated value of the ink concentration in the circulation path and the estimation error which is an error that the estimated value may have is used to determine whether execution of ink discharge control is necessary/unnecessary and whether the amount of ink to be discharged is small/large in the ink discharge control.

Accordingly, in the present embodiment, the discharge amount of ink in the ink discharge control can be reduced as compared with the publicly-known technique of executing the ink discharge control using the estimated concentration value without considering an error of the estimated concentration value. Therefore, the amount of waste ink produced by the ink discharge control can be reduced, which contributes to cost reduction.

Second Embodiment

Next, a printing apparatus according to a second embodiment will be described with reference to FIG. 16 to FIG. 23. In the following description, features identical to or corresponding to those of the printing apparatus described above in the first embodiment are denoted by the same reference numerals as those used in the first embodiment and the detailed description thereof is omitted.

The ink discharge control associated with the increase in ink concentration in the circulation path 600 is executed based on a threshold set according to the occurrence of density unevenness in a printed image, a decrease in ink ejection characteristic, and a decrease in reliability of the circulation function. However, the present inventor has found that density unevenness is caused by an increase in ink concentration relatively smaller than those causing the decrease in ink ejection characteristic and the decrease in reliability of the circulation function.

The visibility of density unevenness can be reduced by executing image density correction of controlling the number of ink droplets (the number of dots) applied to a print medium for the unevenness in the amount of ejection by the print head 26. Incidentally, for example, in a case where correction information acquired for image density correction in the initial adjustment at the time of installation of the apparatus is continuously used even after the ink concentration is changed, there is a possibility that the correction is not appropriately performed and density unevenness occurs.

The present inventor has found that density unevenness may become visible in a case where the ink concentration increases by 2.5% to 3.0%. In contrast, a decrease caused by the above increase in ink concentration was not found in either of the ink ejection characteristics and the reliability of the circulation function. Accordingly, the execution of image density correction makes it possible to set a threshold in line with the decrease in ink ejection characteristic and decrease in reliability of the circulation function, which require ink discharge control in relatively high concentration. This can reduce the number of times of execution of ink discharge control and the amount of waste ink.

Thus, the second embodiment executes determination processing of determining whether to execute image density correction to correct density unevenness caused by a change in ink concentration (hereinafter referred to as "image density correction based on ink concentration" as appropriate) concurrently with the adjustment processing. That is, in the second embodiment, the processing for ink discharge control and the processing for image density correction are executed before or after execution of a job. Based on the results of the processing, the ink discharge control and the image density correction are executed.

The present embodiment executes the determination processing of determining the necessity/unnecessity of execution of image density correction at the time of generation of print data concurrently with the adjustment processing of adjusting the ink concentration in the circulation path 600 using the estimated concentration value acquired in the acquisition processing. That is, in the present embodiment, the determination processing is executed concurrently with the adjustment processing after the acquisition processing. In the following description, the detailed description of the acquisition processing and the adjustment processing, which are the same as those in the first embodiment described above, is omitted and the determination processing is described in detail.

Determination Processing

Figure 16:
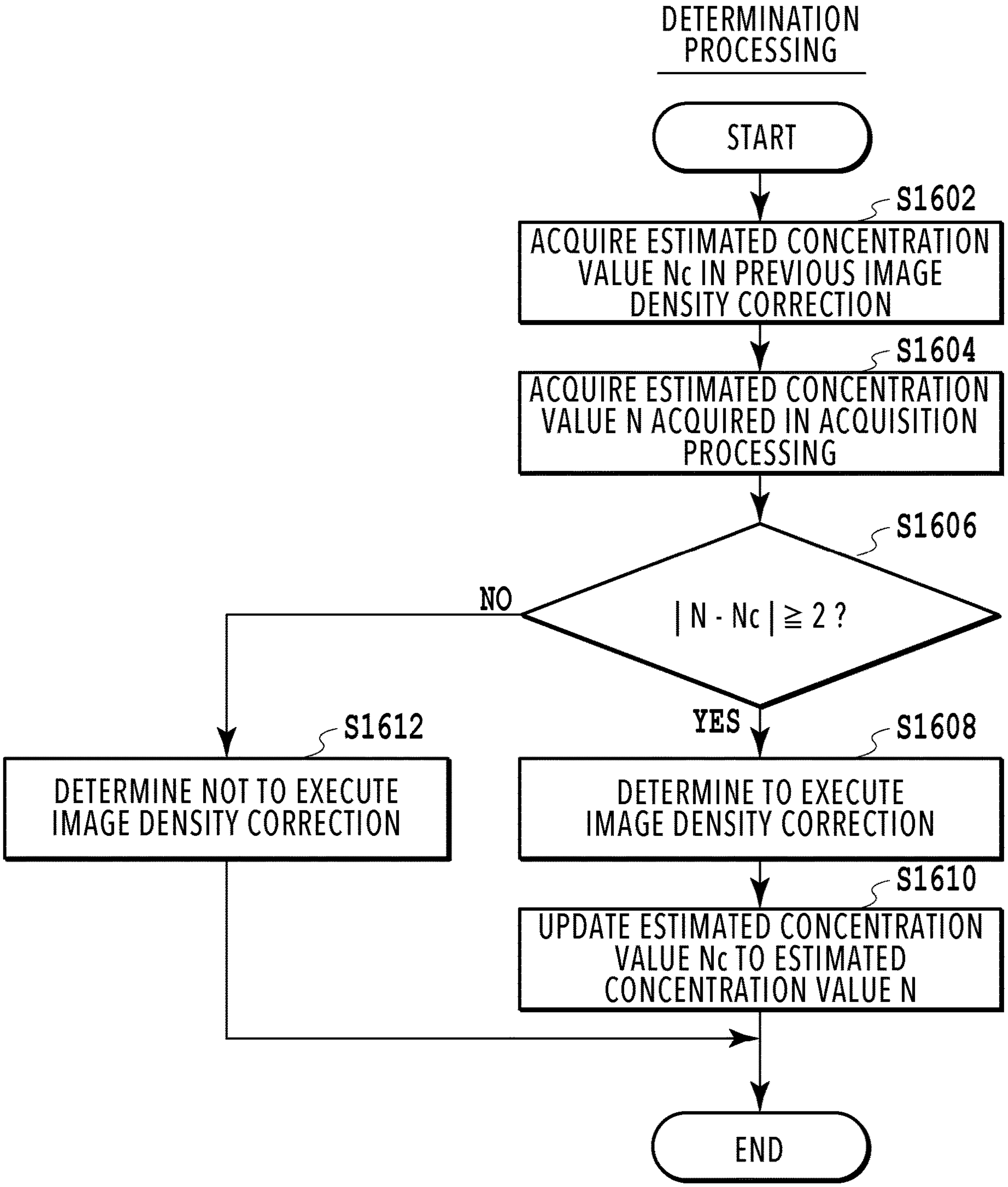
FIG. 16 is a flowchart showing detailed processing contents of determination processing.

FIG. 16 is a flowchart showing detailed processing contents of the determination processing of determining whether to execute the image density correction based on the ink concentration. The determination processing is executed by the image density correction section 812 of the engine controller 204. The procedure shown in the flowchart of FIG. 16 is executed by the CPU of the engine controller 204 loading a program code stored in the ROM of the engine controller 204 into the RAM of the engine controller 204 and executing the program code. Alternatively, part or all of the functions of steps in FIG. 16 may be executed by hardware such as an ASIC or electric circuit.

If the determination processing is started, in S1602, the image density correction section 812 first acquires an estimated concentration value Nc at the time of execution of the latest image density correction. As will be described later, the estimated concentration value Nc at the time of execution of the latest image density correction is stored in the storage area of the engine controller 204 such as the ROM or RAM. Incidentally, in a case where the circulation path 600 is filled with ink for the first time or the circulation path 600 is refilled with ink, for example, the concentration of ink stored in the main tank 606 is acquired. It is assumed that the concentration of ink in the main tank 606 is stored in the storage area.

Next, in S1604, the image density correction section 812 acquires an estimated ink concentration value N acquired in the latest acquisition processing. In S1606, the image density correction section 812 determines whether a difference between the estimated concentration value Nc acquired in S1602 and the estimated concentration value N acquired in S1604 is equal to or greater than 2% ($|N-Nc|\geq 2$).

The threshold 2% is obtained from the following experiment by the present inventor. The present inventor performed image density correction in a resolution of 16 pixels (0.677 m) in 600 dpi in the extending direction of the nozzle array and conducted a sensory evaluation of to what extent a color difference is visible as density unevenness at this frequency. As a result, most of the panelists recognized 1 or more in ΔE2000 as visible. Thus, the present inventor set the standard (proximity ΔE) within 0.8 and obtained the experimental result that the amount of change of ink concentration satisfying this was 2%. Accordingly, the threshold used in S1606 is a value obtained by execution of the experiment as stated above on various conditions. In other words, the threshold is a value that is set as appropriate.

If it is determined in S1606 that $|N-Nc|\geq 2$, the process advances to S1608, where the image density correction section 812 determines to execute the image density correction. After that, the process advances to S1610 and the image density correction section 812 updates the estimated concentration value Nc at the time of execution of the image density correction stored in the storage area to the concentration correction value N acquired in S1604 and finishes the determination processing. If it is not determined in S1606 that $|N-Nc|\geq 2$, the process advances to S1612 and the image density correction section 812 determines not to execute the image density correction and finishes the determination processing. If the determination processing is finished, the image density correction section 812 executes the image density correction at the time of generation of print data for use in a printing operation of a job after the determination processing depending on the necessity/unnecessity of execution of the image density correction determined in the determination processing.

Image Density Correction

Figure 17A:
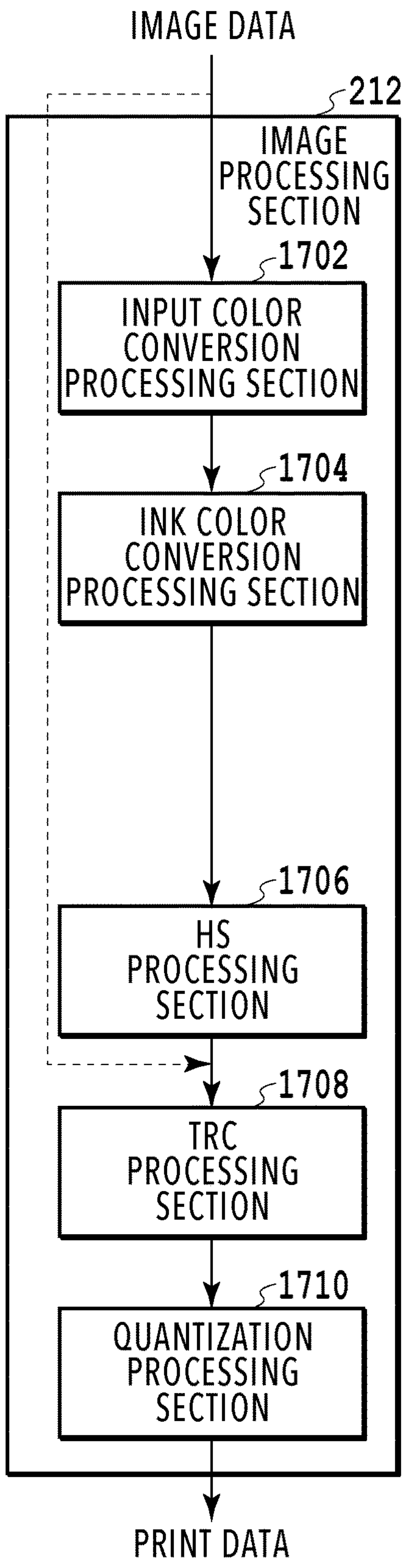
FIGS. 17A and 17B are block diagrams showing functional configurations of an image processing section.
Figure 17B:
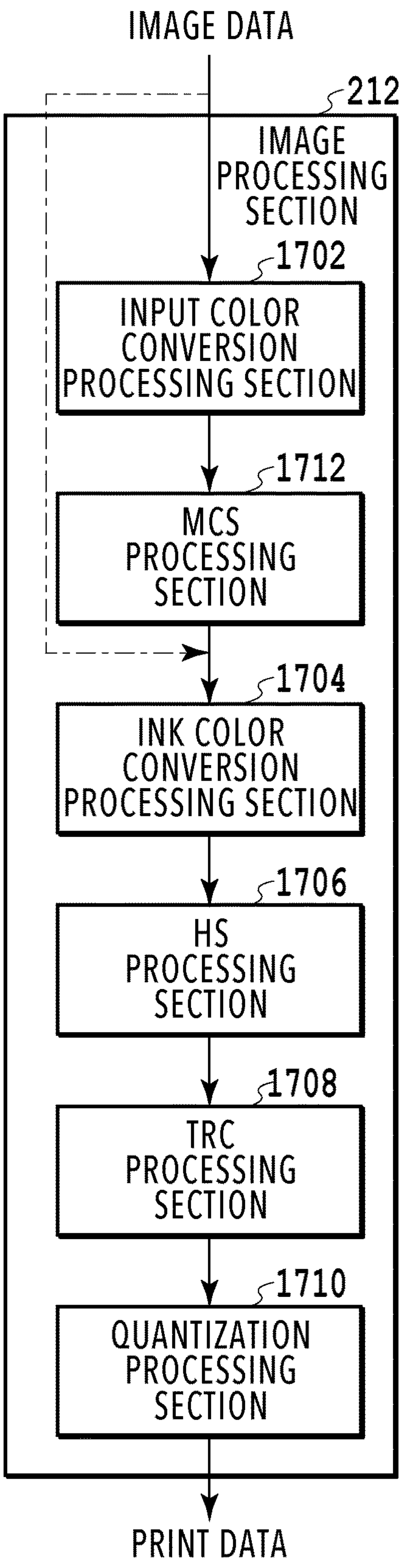

Next, the image density correction based on the ink concentration will be described. As the image density correction based on the ink concentration, the printing apparatus 10 performs head shading (HS) processing and color shading (CS) processing based on the ink concentration. FIGS. 17A and 17B are diagrams showing functional configurations of the image processing section 212 which executes the image density correction; FIG. 17A shows a configuration corresponding to the HS processing and FIG. 17B shows a configuration corresponding to the HS processing and the CS processing. Each feature shown in FIGS. 17A and 17B is implemented by the CPU, ROM, and RAM of the main controller 202.

HS Processing

The HS processing is executed by the image processing section 212. First, the functional configuration of the image processing section 212 which executes the HS processing will be described with reference to FIG. 17A.

The image processing section 212 comprises an input color conversion processing section 1702 which converts image data input from the buffer 218 into image data corresponding to a color gamut of the printing apparatus 10. In the present embodiment, the input image data is data indicating color coordinates (R, G, B) in a color space coordinate system such as sRGB which defines colors represented in a monitor. The input color conversion processing section 1702 converts the input 8-bit image data R, G, B into image data (R', G', B') of the color gamut of the printing apparatus 10. This conversion can use a publicly-known method such as matrix operation processing or processing using a three-dimensional lookup table (LUT). In the present embodiment, a three-dimensional LUT and interpolation calculation are used together for the conversion.

The image processing section 212 also comprises an ink color conversion processing section 1704 which performs conversion processing of converting the image data converted by the input color conversion processing section 1702 into color signals corresponding to the plurality of inks used in the printing apparatus 10. In the present embodiment, since the printing apparatus 10 uses the K, C, M, and Y inks, the image data of RGB signals is converted into image data comprising 8-bit color signals of K, C, M, and Y. For example, this color conversion is also performed using a three-dimensional LUT and interpolation calculation together as in the input color conversion processing section 1702. As another conversion method, a publicly-known method such as matrix operation processing can be used.

The image processing section 212 also comprises an HS processing section 1706 which corrects the image data of ink color signals color-converted by the ink color conversion processing section 1704 depending on the ink ejection characteristic of each nozzle 500 forming the print head 26. The HS processing executed in the HS processing section 1706 will be described later in detail.

The image processing section 212 also comprises a TRC processing section 1708 which adjusts the number of dots printed for each ink color for the image data comprising 8-bit ink color signals HS-processed by the HS processing section 1706. More specifically, the number of dots printed on a print medium is adjusted by correcting the image data so that the number of dots printed on a print medium has a linear relationship with the lightness implemented by the number of dots.

The image processing section 212 also comprises a quantization processing section 1710 which performs quantization processing for the 8-bit 256-level ink color image data processed by the TRC processing section 1708 to obtain 1-bit binary print data. The method for the quantization processing may be any of various publicly-known techniques such as a dithering method or error diffusion method. After the quantization processing, the processing subsequent to the acquisition of the attribute information (S308) described in the image processing shown in the flowchart of FIG. 3 is executed to generate print data, and the generated print data is stored in the buffer 218.

Figure 18:
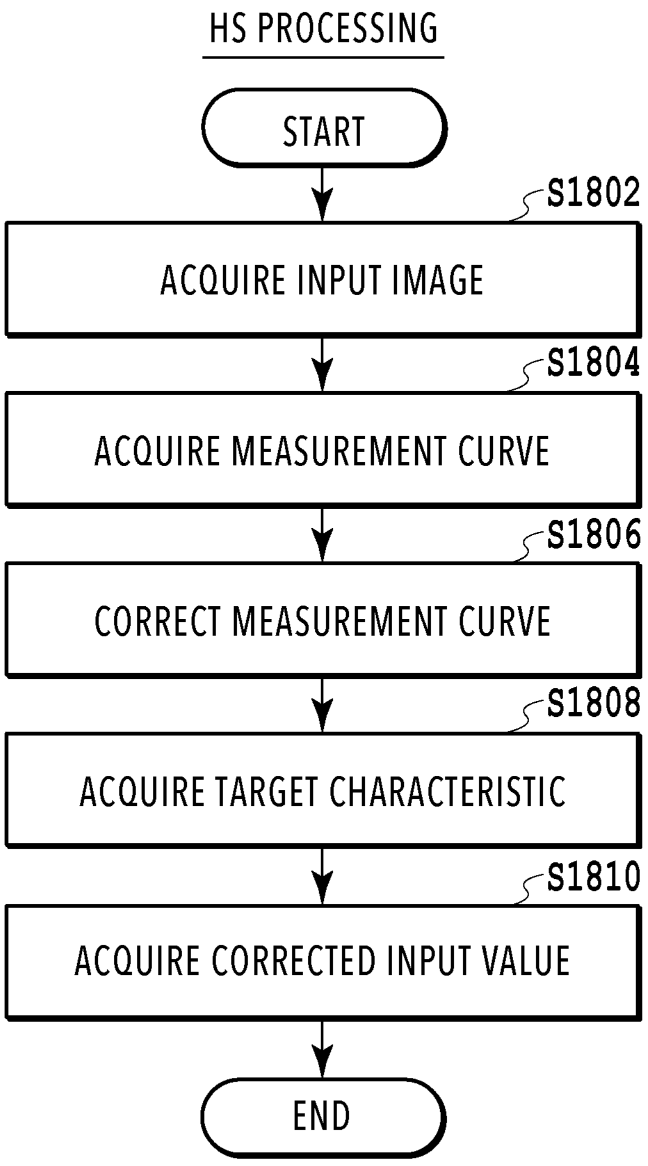
FIG. 18 is a flowchart showing detailed processing contents of HS processing.
Figure 19:
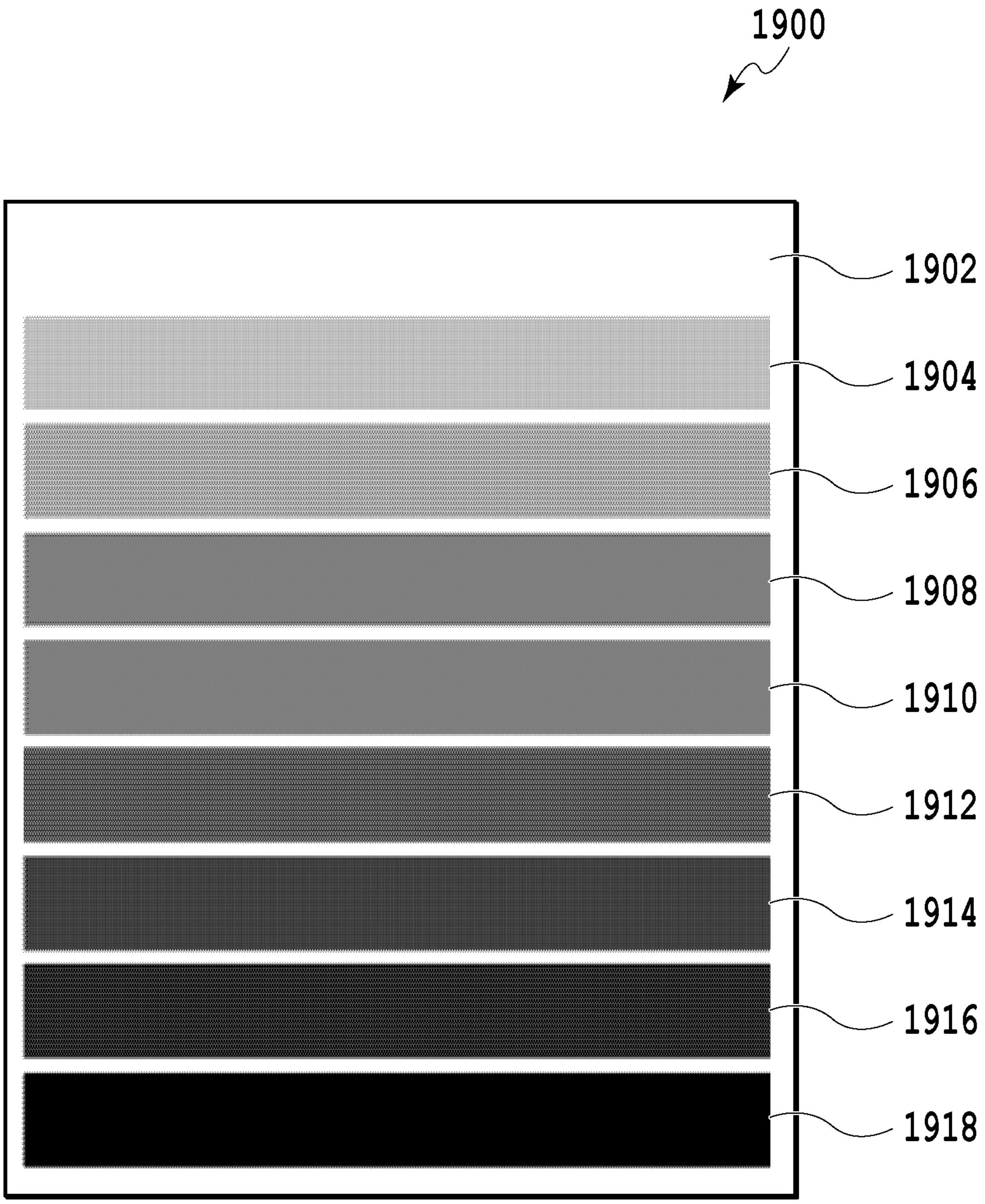
FIG. 19 is a diagram showing an example of a measurement image.
Figure 20A:
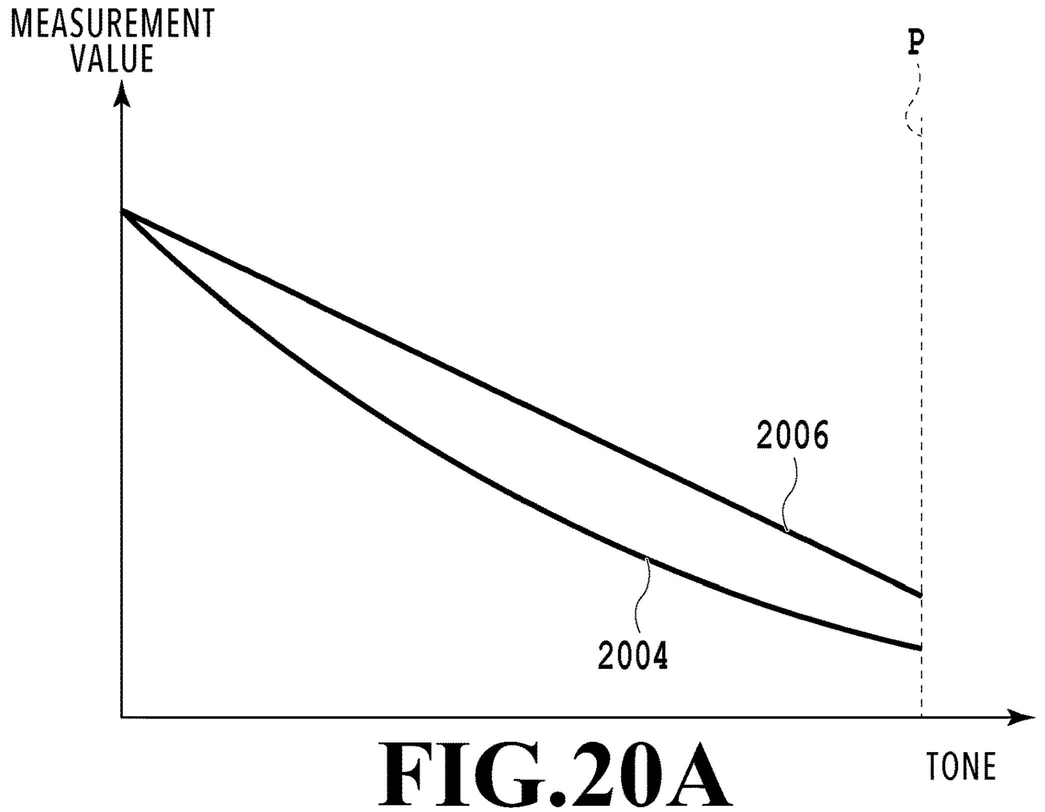
FIGS. 20A and 20B are diagrams showing measurement curves.
Figure 20B:
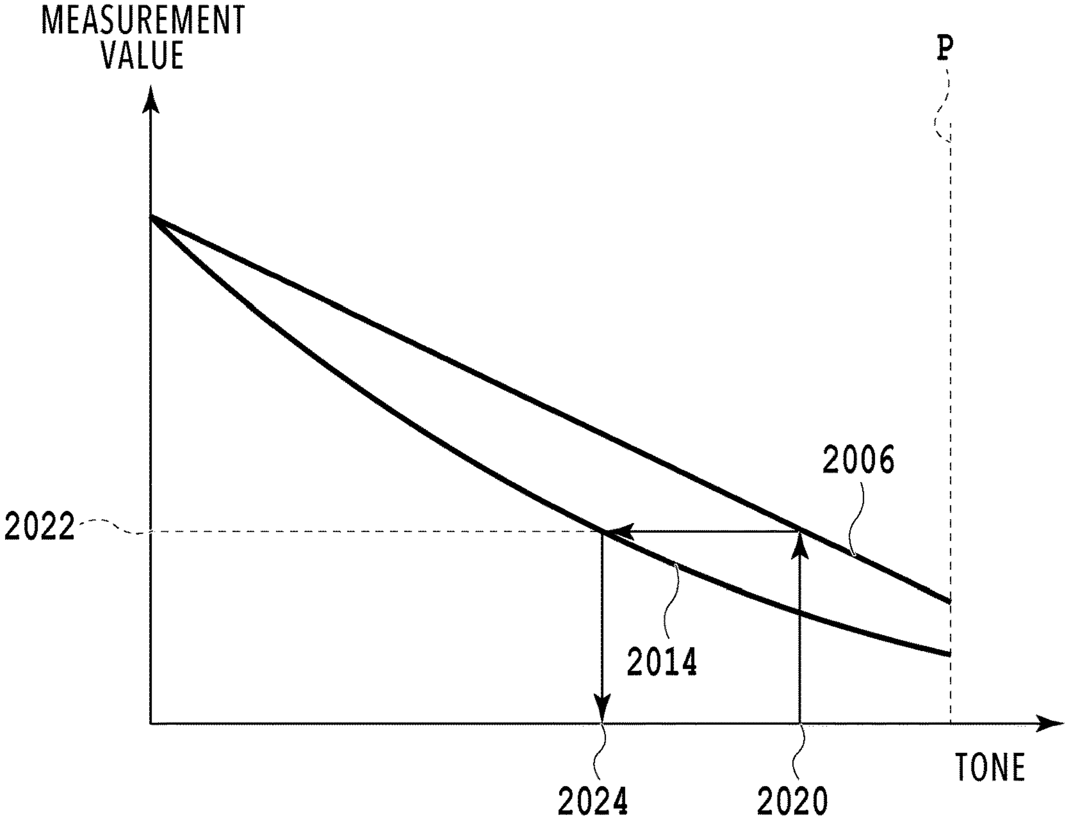

Next, the HS processing executed in the HS processing section 1706 based on the ink concentration will be described. FIG. 18 is a flowchart showing detailed processing contents of the HS processing. FIG. 19 is a diagram showing an example of a measurement image to acquire a concentration characteristic of each nozzle 500 in the print head 26. FIGS. 20A and 20B are diagrams showing measurement curves; FIG. 20A shows a measurement curve acquired from a scanned image and FIG. 20B shows a corrected measurement curve. The HS processing of FIG. 18 is executed by the HS processing section 1706 of the image processing section 212 in the main controller 202. The procedure shown in the flowchart of FIG. 18 is executed by the CPU of the main controller 202 loading a program code stored in the ROM of the main controller 202 into the RAM of the main controller 202 and executing the program code. Alternatively, part or all of the functions of steps in FIG. 18 may be executed by hardware such as an ASIC or electric circuit.

If the HS processing is started, in S1802, the HS processing section 1706 first acquires ink color signal image data output from the ink color conversion processing section 1704 as an input image. Next, in S1804, the HS processing section 1706 acquires a measurement curve in a position corresponding to a pixel of interest.

Here, the measurement curve is described. The measurement curve is generated by printing a measurement image on a print medium and reading the printed measurement image. The measurement image 1900 comprises, for example, nine patches 1902 to 1918 of different tones as shown in FIG. 19. Each patch is printed only in a single ink color. In the present embodiment, it is assumed that the patches are printed only with the K ink.

To print the measurement image 1900 in the single ink color, image data of the measurement image 1900 is input to the image processing section 212 and then input to the TRC processing section 1708. The image data of the measurement image 1900 can be thus directly input to the TRC processing section 1708 while bypassing the input color conversion processing section 1702, the ink color conversion processing section 1704, and the HS processing section 1706 (see the dotted arrow in FIG. 17A). After that, the measurement image 1900 is printed on a print medium based on the print data of the measurement image 1900 generated through the processing in the quantization processing section 1710.

The measurement image 1900 printed on the print medium is scanned by a scanner (not shown) provided in the printing apparatus 10 to obtain a scanned image. Since a publicly-known technique can be used for the scanner to scan the measurement image 1900 printed on the print medium and its position of arrangement, the detailed description thereof is omitted. The scanned image is scanned in three channels of RGB and then converted into a 1-channel scanned image by a color conversion table prepared in advance according to the color characteristics of the scanner. The color conversion table may be, for example, a color conversion table for conversion into a 16-bit value linear with respect to Y in a CIE XYZ color space.

Incidentally, the color space of the scanned image may be arbitrarily determined and may be density or L* of CIELab*. In a case where the measurement image is printed with a color ink such as the C, M, or Y ink, a value corresponding to chroma can be used instead of a value corresponding to lightness. For example, values of R, G, and B channels may be used as values corresponding to complementary colors of C, M, and Y. Further, the scanned image of the measurement image 1900 to acquire a measurement curve may be acquired, for example, before the execution of the HS processing. In this case, in S1804, the scanned image stored in the storage area is acquired.

From signal values of the scanned image thus acquired, a measurement curve is acquired by interpolation calculation (see FIG. 20A). In the measurement curve of FIG. 20A, the horizontal axis is an input signal value from patch 1902 to patch 1918 of the measurement image 1900 and the vertical axis is a signal value of the scanned image. A point P in FIG. 20A is the upper limit of the input signal value of each patch and is 255 in the present embodiment because the input signal value has 8 bits.

The measurement curve acquired by interpolation calculation from the scanned image signal values of patches 1902 to 1918 is a measurement curve 2004. In the present embodiment, piecewise linear interpolation is used as the interpolation method. The interpolation method can be arbitrarily determined and various publicly-known methods such as a method of using a spline can be used. The measurement curve 2004 indicates a concentration characteristic of a nozzle corresponding to a pixel position x and is acquired in a number corresponding to the number of nozzles 500 used to print the measurement image 1900. The acquired measurement curve differs according to the concentration characteristic of each nozzle 500; for example, a measurement curve 2004 of a nozzle 500 of a small amount of ejection is shifted upward (in the direction of lightness).

Figure 21A:
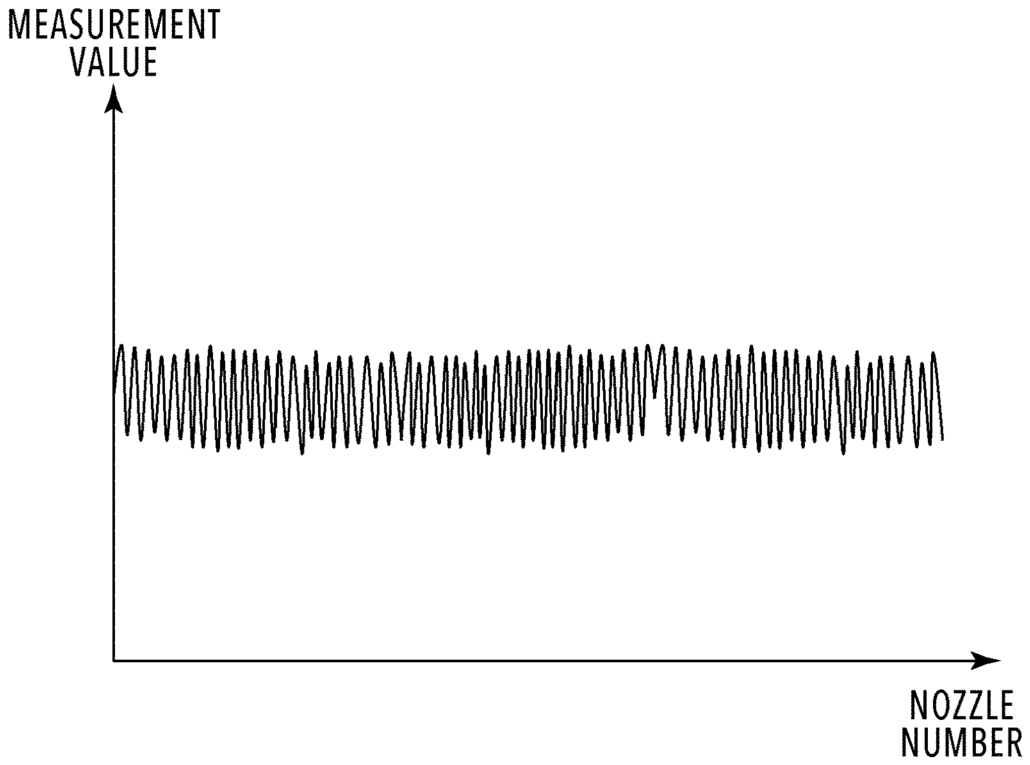
FIGS. 21A and 21B are diagrams showing measurement values in an area corresponding to a predetermined patch in a scanned image.
Figure 21B:
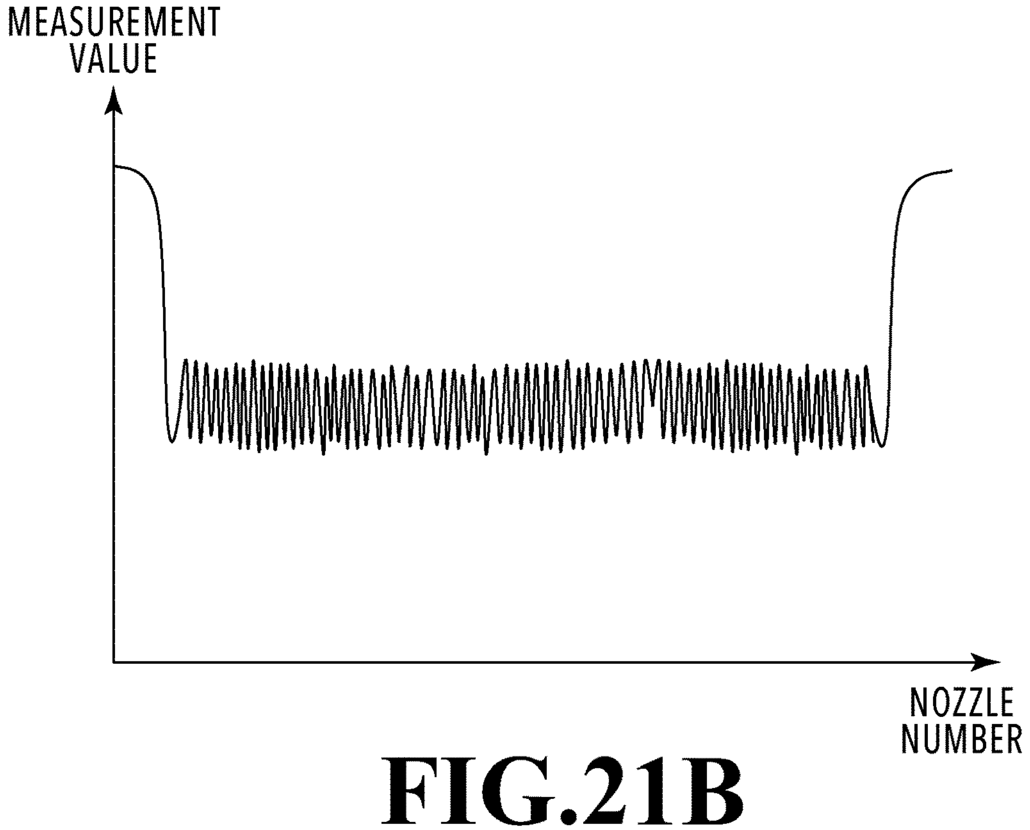

Returning to FIG. 18, if the measurement curve is acquired, in S1806, the HS processing section 1706 corrects the error of the measurement values in the acquired measurement curve and acquires a corrected measurement curve 2014 (see FIG. 21B). FIGS. 21A and 21B are diagrams showing measurement values in an area corresponding to patch 1918 in the scanned image; FIG. 21A shows measurement values in a case where the print medium is not warped and FIG. 21B shows measurement values in a case where the print medium is warped. In each of FIGS. 21A and 21B, the horizontal axis is a nozzle number and the vertical axis is a signal value of the scanned image. The nozzle number is a number assigned to each nozzle provided in the print head 26. The measurement result is as shown in FIG. 21A in a main body configuration in which the print medium is not warped and the print head 26 and the scanner are arranged in positions sufficiently close to each other. The measurement result is as shown in FIG. 21B in a main body configuration in which the print medium is warped and the print head 26 and the scanner are arranged in positions distant from each other, or in a main body configuration in which a drying step is interposed between printing and scanning. The comparison between the two measurement results shows that the measurement values at the ends are not correctly acquired due to the warp in the print medium in the measurement result in FIG. 21B. In the measurement result in FIG. 21B, waveform intervals are narrow at the ends because the ends of the print medium float up and tilt with respect to the scanner. The correction processing executed for the measurement curve is processing of correcting measurement values in abnormal areas at the ends using the measurement values in a normal area other than the ends. For the correction processing executed for the measurement curve, publicly-known techniques can be used.

In S1808, the HS processing section 1706 acquires a target characteristic 2006. The target characteristic 2006 is a target characteristic predetermined according to the measurement curve of each nozzle 500. In the present embodiment, as shown in FIG. 20A, a measurement value linear with respect to tone is determined to be the target characteristic. After that, in S1810, the HS processing section 1706 acquires a corrected input value. More specifically, the HS processing section 1706 acquires a target value 2022 that is a value corresponding to the target characteristic 2006 corresponding to an input value 2020 acquired in the S1802 (see FIG. 20B). A tone value corresponding to the target value 2022 is then acquired from the corrected measurement curve 2014 and the acquired value is acquired as a corrected input value 2024. In the subsequent jobs, for example, the corrected measurement curve 2014 acquired in S1806 of the HS processing is used to generate print data until the execution of the image density correction is determined again in the determination processing.

CS Processing

The CS processing is executed by the image processing section 212. First, a functional configuration of the image processing section 212 which executes the HS processing and the CS processing will be described with reference to FIG. 17B.

In addition to various features for use in the HS processing, the image processing section 212 comprises an MCS processing section 1712 which executes the CS processing of correcting RGB signal image data according to the ejection characteristics of the nozzles in the print head 26. A measurement image used in the CS processing is a plurality of patches printed with different input signals R, G, and B. For example, each of R, G, and B has five tones, 0, 64, 128, 192, and 255, and $5^3$=125 multicolor patches are printed. However, the combination of the patches is not limited to this and may be arbitrarily determined.

Image data of the measurement image used in the CS processing is input to the image processing section 212 and then input to the ink color conversion processing section 1704. The image data of the measurement image can be thus directly input to the TRC processing section 1708 while bypassing the input color conversion processing section 1702 and the MCS processing section 1712 (see the dash-dotted arrow in FIG. 17B). After that, the measurement image is printed on a print medium based on the print data of the measurement image generated through the HS processing and the like. The printed measurement image is scanned by the scanner to obtain a scanned image. The scanned image is kept as an RGB 3-channel image without being converted into a 1-channel image.

Figure 22:
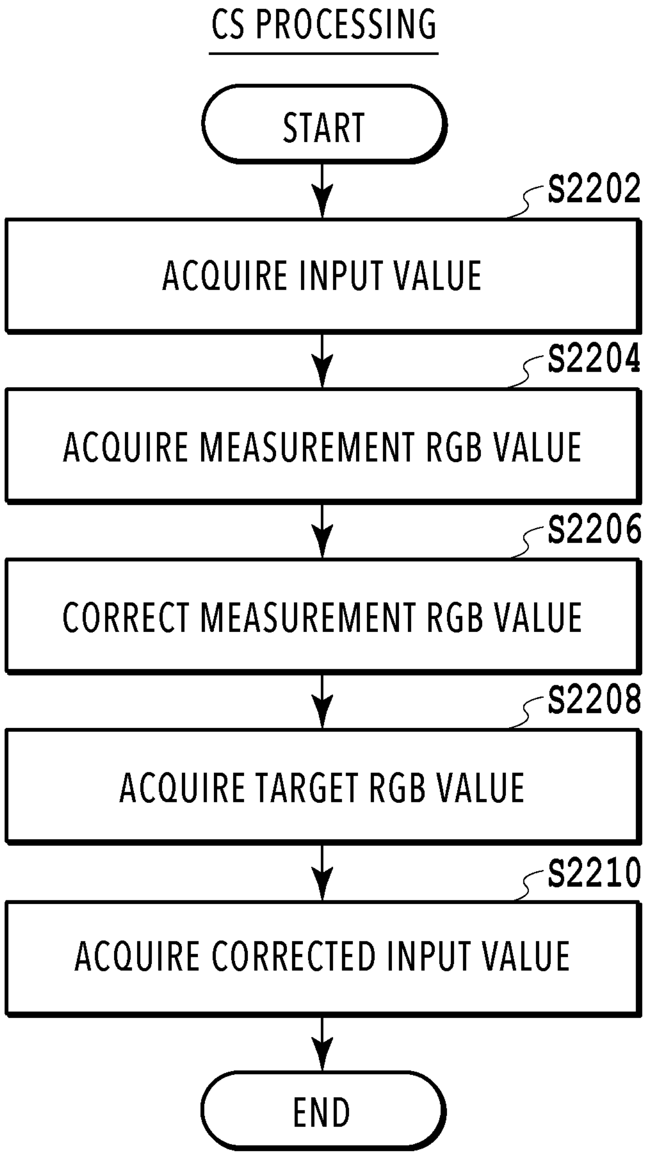
FIG. 22 is a flowchart showing detailed processing contents of CS processing.

Next, specific processing contents of the CS processing based on the ink concentration will be described. FIG. 22 is a flowchart showing the detailed processing contents of the CS processing. The CS processing is different from the HS processing mainly in that the measurement image has multiple colors and measurement values are RGB 3-channel ones. The CS processing of FIG. 22 is executed by the MCS processing section 1712 of the image processing section 212 in the main controller 202. The procedure shown in the flowchart of FIG. 22 is executed by the CPU of the main controller 202 loading a program code stored in the ROM of the main controller 202 into the RAM of the main controller 202 and executing the program code. Alternatively, part or all of the functions of steps in FIG. 22 may be executed by hardware such as an ASIC or electric circuit.

If the CS processing is started, in S2202, the MCS processing section 1712 first receives image data corresponding to the color gamut of the printing apparatus 10 output from the input color conversion processing section 1702 as an input image and acquires an input value. Next, in S2204, the MCS processing section 1712 acquires a measurement RGB value of a nozzle position corresponding to a pixel of interest from the scanned image scanned by the scanner. In the present embodiment, 125 RGB values are acquired as measurement values of 125 patches. However, the scanned image may be acquired, for example, before the execution of the CS processing. In this case, the scanned image stored in the storage area is acquired in S2204.

After that, in S2206, the MCS processing section 1712 corrects the measurement RGB value. A publicly-known technique can be used for this correction. Differently from the HS processing, a representative value of a normal area is determined for each of three channels of RGB and applied to an abnormal area. In S2208, a target RGB value is acquired. For example, the target RGB value is acquired by referring to a LUT (not shown) storing correspondence between input RGB and target RGB of the scanned image. After that, in S2210, the MCS processing section 1712 acquires a corrected input value.

Figure 23:
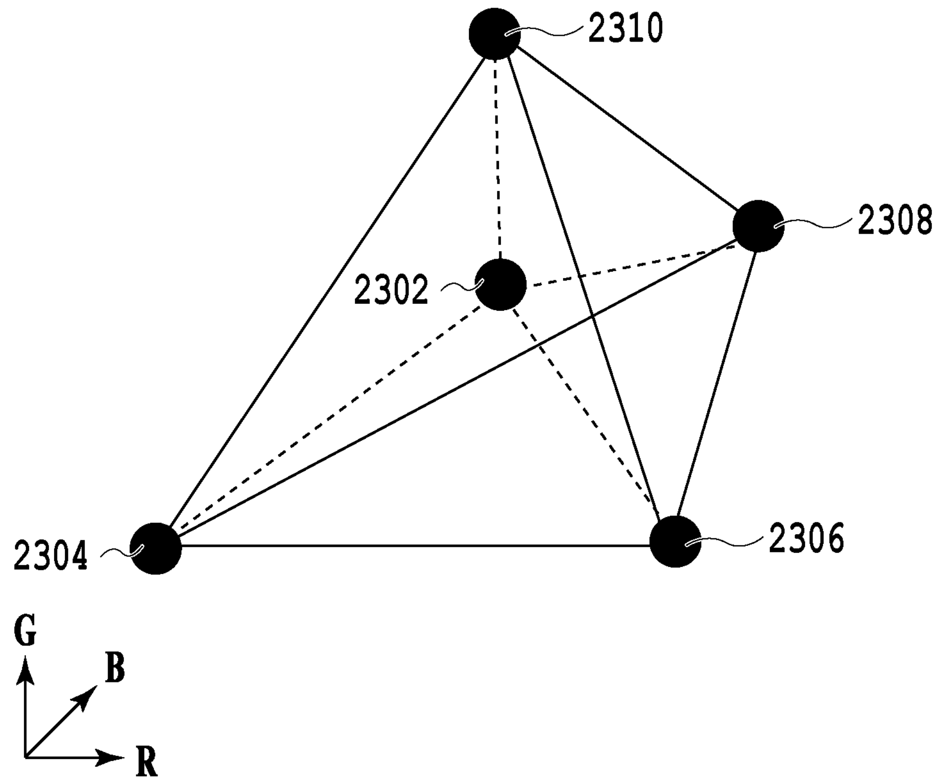
FIG. 23 is a diagram showing a three-dimensional space with axes of RGB values of a scanned image.

Here, the method of acquiring the corrected input value in S2210 is described. FIG. 23 shows a diagram showing a three-dimensional space with axes of RGB values of the scanned image. In FIG. 23, a point 2302 indicates the target RGB value acquired in S2208. Further, in FIG. 23, points 2304, 2306, 2308, and 2310 indicate four corrected measurement RGB values selected from 125 corrected measurement RGB values acquired in S2206 to form the smallest tetrahedron including the point 2302. A corrected input value is acquired by calculating a distance between the point 2302 and each of the points 2304, 2306, 2308, and 2310 and interpolating the input RGB values of the four points according to the ratio between the distances. In the subsequent jobs, for example, the correction information acquired in S2206 of the CS processing is used to generate print data until the execution of the image density correction is determined again in the determination processing.

Effect and Advantage

As described above, the printing apparatus 10 of the second embodiment executes ink discharge control like the first embodiment and also executes the image density correction based on the ink concentration at the time of generation of print data based on the estimated ink concentration value in the circulation path 600. Accordingly, in addition to the above effect and advantage of the first embodiment, the present embodiment can increase the threshold for determination of the necessity/unnecessity of execution of ink discharge control while suppressing the occurrence of density unevenness, reduce the number of times of ink discharge control, and reduce the amount of waste ink.

In other words, the execution of the image density correction based on the ink concentration enables execution of ink discharge control at a timing at which the estimated ink concentration value is relatively high and thereby enables suppression of an increase in the amount of waste ink produced by ink discharge control. For example, the first discharge control is executed so that a change of the estimated ink concentration value in the circulation path 600 after ink discharge control from the estimated concentration value in the previous image density correction is less than 2%. As a result, the printed image can be printed without density unevenness after the first discharge control even without the image density correction.

Other Embodiments

The embodiments described above may be modified as shown in (1) to (7) below.

Figure 24:
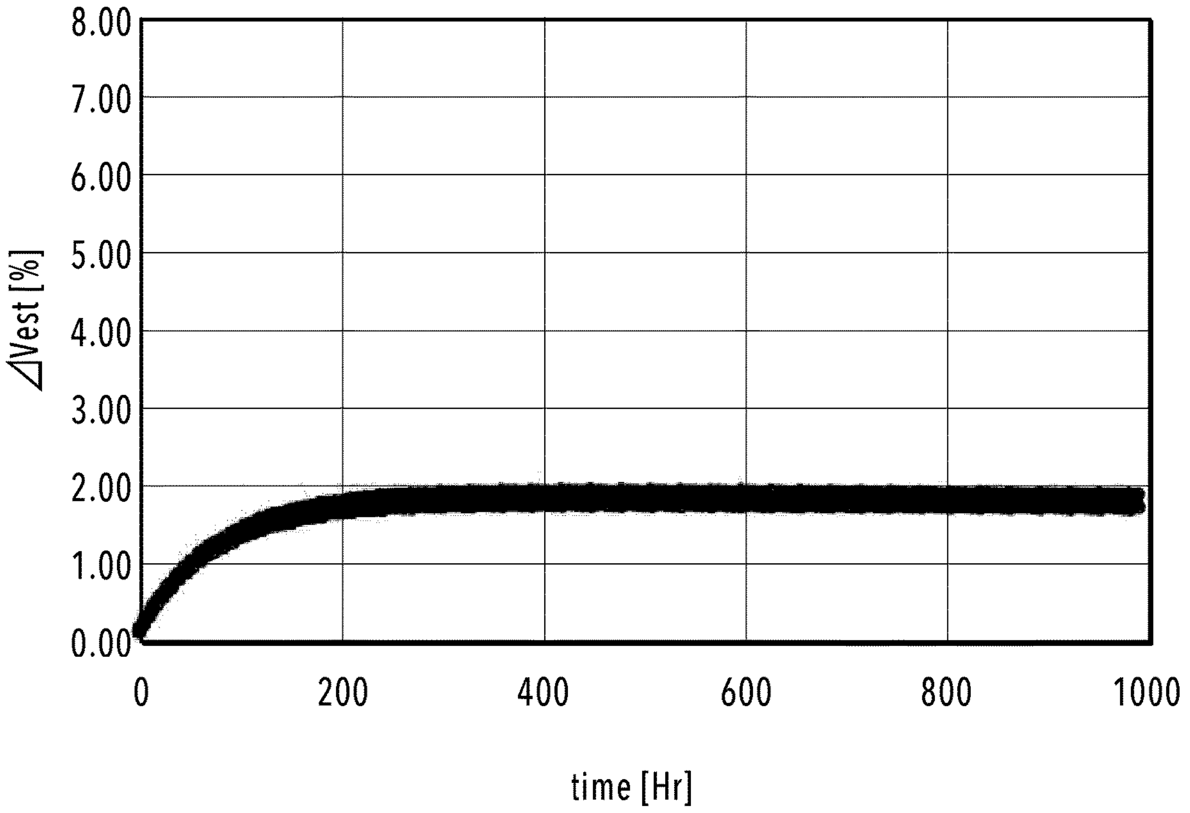
FIG. 24 is a graph showing the progression of an estimation error with a print duty of 2%.

(1) In the first embodiment, the upper limit of the estimation error in a case where the print duty is 0% is stored as the estimation error. However, the invention is not limited to this. The estimation error decreases with the increase of the print duty. FIG. 24 is a diagram showing the progression of the estimation error in a case where the print duty is changed to 2% from the condition for the experiment by which the experimental result of FIG. 13 was obtained. In FIG. 24, the upper limit of the estimation error is about 2%. Thus, the upper limit of the estimation error depending on the print duty may be stored. In this case, an estimation error corresponding to a print duty in a printing operation by a job is used in the adjustment processing. Instead of the upper limit value of the estimation error, for example, a median value between the upper and lower limit values of the estimation error or a predetermined value such as a value between the median value and the upper limit value may be used.

(2) In the first embodiment, the two types of discharge control, the first discharge control and the second discharge control, are executed based on the estimated concentration value and the estimation error. However, the invention is not limited to this. The second discharge control may be executed at a time at which the number of times that the first discharge control is consecutively executed reaches a predetermined number and the first discharge control may be executed in a case where the number of times of execution is less than the predetermined number. In this case, upon the execution of the second discharge control, the count value of the number of times of execution of first discharge control is initialized.

More specifically, in a case where discharge control is executed based on the estimated concentration value and the estimation error, it is determined whether the condition N+Er≥Th_1 is satisfied after the acquisition of the estimated concentration value N and the estimation error Er, and if the condition is not satisfied, discharge control is not executed. If the above condition is satisfied, the count value of the number of times of execution of first discharge control is referred to. If the count value is less than a predetermined value, the first discharge control is executed and "1" is added to the count value. If the count value is equal to or greater than the predetermined value, the second discharge control is executed and the count value is initialized to "0."

Alternatively, in a case where discharge control is executed based on only the estimated concentration value, it is determined whether the condition that the estimated concentration value N is equal to or greater than the limit value Th_1 is satisfied and, if the condition is not satisfied, discharge control is not executed. If the above condition is satisfied, the count value of the number of times of execution of first discharge control is referred to. If the count value is less than a predetermined value, the first discharge control is executed and "1" is added to the count value. If the count value is equal to or greater than the predetermined value, the second discharge control is executed and the count value is initialized to "0."

(3) In the first embodiment, whether the ink discharge control is necessary/unnecessary and whether the amount of ink to be discharged is small/large in the ink discharge control are determined based on the estimated concentration value and the estimation error. However, the invention is not limited to this. For example, the image density correction such as the HS processing and the CS processing may be executed after discharge control with a large ink discharge amount (second discharge control). Further, although not particularly described in the above embodiments, the printing apparatus 10 may execute image density correction based on the ejection characteristics of the nozzles. That is, in this case, in the second embodiment, if the image density correction based on the ink concentration has never been executed, the image density correction based on the ejection characteristics of the nozzles is executed. After the execution of the image density correction, the image density correction based on the ink concentration is executed. As described in the above embodiments, in the image density correction based on the ink concentration, correction information is acquired using information obtained by printing and scanning the measurement image. Thus, it also corresponds to density unevenness based on the ejection characteristics of the nozzles.

(4) Although not particularly described in the second embodiment, in the printing apparatus 10, a plurality of items of correction information of each of the HS processing and the CS processing may be stored in the storage area according to the ink concentration. In this case, if the execution of the image density correction based on the ink concentration is determined in the determination processing, correction information associated with an ink concentration approximate to the estimated concentration value is acquired and used to execute the HS processing and the CS processing. In the subsequent jobs, the acquired correction information is used to generate print data until the execution of image correction processing based on the ink concentration is determined again by the determination processing.

(5) In the second embodiment, the adjustment processing and the determination processing are simultaneously executed after the acquisition processing. However, the invention is not limited to this. The determination processing may be executed after the acquisition processing and the adjustment processing. Although not particularly described in the second embodiment, even in a case where the execution of the image density correction is determined in the determination processing, the image density correction may be omitted if ink discharge control has been executed in the adjustment processing. Accordingly, in a case where the determination processing is executed after the adjustment processing, the determination processing may be omitted if ink discharge control has been executed in the adjustment processing.

(6) Although not particularly described in the first embodiment, the threshold Th is initialized and set at "0" also at a predetermined timing such as a timing of refilling of ink to the circulation path 600. In addition, although the above embodiments selectively execute one of the two types of discharge control, the first discharge control and the second discharge control with a larger ink discharge amount than the first discharge control, the invention is not limited to this. For example, a plurality of limit values may be set so as to selectively execute specific discharge control of three or more types of discharge control with different amounts of ink discharge.

(7) The above embodiments and various modifications shown in (1) to (6) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-095681, filed Jun. 9, 2023, and Japanese Patent Application No. 2023-110555, filed Jul. 5, 2023, which are hereby incorporated by reference herein in their entirety.

What is claimed is:

1. A printing apparatus comprising:

a printing element board comprising a nozzle configured to eject printing material;

a circulation path comprising the printing element board and configured to circulate printing material, supply the printing element board with printing material, and collect printing material not ejected from the printing element board;

an acquisition unit configured to acquire information on concentration of printing material circulating through the circulation path; and a discharge control unit configured to execute discharge control of printing material in which printing material is discharged from the circulation path according to the information on concentration and the circulation path is supplied with an amount of printing material corresponding to a discharge amount, wherein in a case where the discharge control is executed, the discharge control unit selectively executes one of (1) first discharge control in which a discharge amount of printing material is a first discharge amount and (2) second discharge control in which the discharge amount is a second discharge amount greater than the first discharge amount, wherein the information on concentration comprises (1) an estimated concentration value which is an estimated value of concentration of the printing material and (2) an estimation error which is an error that may occur in the estimated concentration value, and wherein the estimation error differs according to a print duty.

2. A printing apparatus comprising:

a printing element board comprising a nozzle configured to eject printing material;

a circulation path comprising the printing element board and configured to circulate printing material, supply the printing element board with printing material, and collect printing material not ejected from the printing element board;

an acquisition unit configured to acquire information on concentration of printing material circulating through the circulation path; and a discharge control unit configured to execute discharge control of printing material in which printing material is discharged from the circulation path according to the information on concentration and the circulation path is supplied with an amount of printing material corresponding to a discharge amount, wherein in a case where the discharge control is executed, the discharge control unit selectively executes one of (1) first discharge control in which a discharge amount of printing material is a first discharge amount and (2) second discharge control in which the discharge amount is a second discharge amount greater than the first discharge amount, wherein the information on concentration comprises (1) an estimated concentration value which is an estimated value of concentration of the printing material and (2) an estimation error which is an error that may occur in the estimated concentration value, wherein the discharge control unit executes first control in which the first discharge control is executed in a case where a sum of the estimated concentration value and the estimation error is equal to or greater than a limit value of printing material concentration which causes at least one of occurrence of density unevenness in a printed image, decrease in ejection characteristic of printing material from the nozzle, and decrease in reliability of a printing material circulating function in the circulation path, and wherein the discharge control unit executes second control in which the second discharge control is executed in a case where at least one of (1) a first condition that the sum of the estimated concentration value and the estimation error is equal to or greater than the limit value and (2) a second condition that a ratio between the estimated concentration value and the estimation error is equal to or greater than a ratio between the estimated concentration value and the estimation error in the first discharge control in a latest occurrence of the first control is satisfied, and the first discharge control is executed in a case where neither the first condition nor the second condition is satisfied.

3. The printing apparatus according to claim 2, wherein the discharge control unit executes the first control in a case where a threshold is an initial value and executes the second control in a case where the threshold is set at a value different from the initial value, wherein in the first control, in a case where the first discharge control is executed, the discharge control unit sets the threshold at the estimated concentration value, and wherein in the second control, in a case where the second discharge control is executed, the discharge control unit sets the threshold at the initial value.

4. The printing apparatus according to claim 1, wherein in a case where a number of times that the first discharge control has been consecutively executed is less than a predetermined number of times, the discharge control unit executes the first discharge control again, and wherein the discharge control unit executes the second discharge control in a case where the number of times that the first discharge control is consecutively executed reaches the predetermined number of times.

5. The printing apparatus according to claim 1, further comprising an image processing unit configured to execute image density correction based on printing material concentration in image processing for generating print data for printing on a print medium, wherein in a case where a difference between the estimated concentration value acquired by the acquisition unit and the estimated concentration value in latest execution of processing relating to the image density correction is equal to or greater than a threshold, the image processing unit executes the image density correction as the processing.

6. The printing apparatus according to claim 1, further comprising an image processing unit configured to execute image density correction based on printing material concentration in image processing for generating print data for printing on a print medium, wherein in a case where a difference between the estimated concentration value acquired by the acquisition unit and the estimated concentration value in latest execution of processing relating to the image density correction is equal to or greater than a threshold, the image processing unit acquires correction information for use in the image density correction as the processing.

7. The printing apparatus according to claim 5, wherein the threshold corresponds to an amount of change of concentration of printing material which causes density unevenness in a printed image.

8. The printing apparatus according to claim 6, wherein the threshold corresponds to an amount of change of concentration of printing material which causes density unevenness in a printed image.

9. The printing apparatus according to claim 1, wherein the discharge control unit discharges printing material from the circulation path by preliminary ejection of ejecting printing material not contributing to printing from the nozzle of the printing element board or suction discharge of forcibly sucking and discharging printing material from the nozzle.

10. The printing apparatus according to claim 1, wherein the printing material includes (1) an ink containing a pigment and (2) a processing liquid for applying predetermined processing to the ink ejected to a print medium.

11. A control method of a printing apparatus configured to execute discharge control of printing material concentration in which, according to concentration of printing material circulating through a circulation path comprising a printing element board comprising a nozzle configured to eject printing material, printing material is discharged from the circulation path and an amount of printing material corresponding to a discharge amount is supplied to the circulation path, the control method comprising:

acquiring information on concentration of printing material circulating through the circulation path; and selectively executing, according to the information on concentration, one of (1) first discharge control in which a discharge amount of printing material concentration is a first discharge amount and (2) second discharge control in which the discharge amount is a second discharge amount greater than the first discharge amount, wherein the information on concentration comprises (1) an estimated concentration value which is an estimated value of concentration of the printing material and (2) an estimation error which is an error that may occur in the estimated concentration value, and wherein the estimation error differs according to a print duty.

* * * * *